(12) United States Patent
Eriksson et al.

(10) Patent No.: US 9,108,826 B2
(45) Date of Patent: Aug. 18, 2015

(54) CRANE CONTROL

(71) Applicant: KONECRANES PLC, Hyvinkää (FI)

(72) Inventors: Lasse Eriksson, Espoo (FI); Harri Ylä-Soininmäki, Hämeenlinna (FI); Janne Salomäki, Hyvinkää (FI)

(73) Assignee: KONECRANES PLC, Hyvinkää (FI)

( * ) Notice: Subject to any disclaimer, the term of this patent is extended or adjusted under 35 U.S.C. 154(b) by 0 days.

(21) Appl. No.: 14/345,874

(22) PCT Filed: Sep. 20, 2012

(86) PCT No.: PCT/FI2012/050906
§ 371 (c)(1),
(2) Date: Mar. 19, 2014

(87) PCT Pub. No.: WO2013/041770
PCT Pub. Date: Mar. 28, 2013

(65) Prior Publication Data
US 2014/0224755 A1    Aug. 14, 2014

(30) Foreign Application Priority Data

Sep. 20, 2011   (FI) .................. 20115922 U

(51) Int. Cl.
*G06F 19/00*     (2011.01)
*B62D 53/06*     (2006.01)
(Continued)

(52) U.S. Cl.
CPC ................. *B66C 13/06* (2013.01); *B66C 13/46* (2013.01); *G01C 9/08* (2013.01)

(58) Field of Classification Search
CPC ........ B66C 13/06; B66C 13/46; B66C 23/36; B66C 23/72; B66C 23/76; B66C 2700/0371; B66C 2700/0392; B66C 13/063; G01C 9/08
USPC ......................................... 701/50; 280/425.1
See application file for complete search history.

(56) References Cited

U.S. PATENT DOCUMENTS 4,172,685 A  * 10/1979 Nabeshima et al. ........ 414/139.7
5,495,955 A  *  3/1996 Shibata ......................... 212/275
(Continued)

FOREIGN PATENT DOCUMENTS

DE    42 38 795 A1    7/1993
DE    100 08 235 A1    9/2001
(Continued)

OTHER PUBLICATIONS

Finnish Search Report issued in Finnish Application No. 20115922 on Jun. 27, 2012.
(Continued)

*Primary Examiner* — Muhammad Shafi
(74) *Attorney, Agent, or Firm* — Birch, Stewart, Kolasch & Birch, LLP

(57) ABSTRACT

To facilitate the use of a crane, an angle feedback information on a rope angle (θ) of the crane is received, the angle feedback information being measured by means of a sensor at or adjacent to a trolley; and the angle feedback information is corrected by compensating an error caused by a speed change, and processed to provide movement instructions or other control information relating to the crane on the basis of real-time corrected angle information.

35 Claims, 17 Drawing Sheets

(51) Int. Cl.
  *B66C 13/06* (2006.01)
  *B66C 13/46* (2006.01)
  *G01C 9/08* (2006.01)

(56) References Cited

U.S. PATENT DOCUMENTS

| | | | |
|---|---|---|---|
| 5,806,696 A | * | 9/1998 | Hytonen ............... 212/270 |
| 5,938,052 A | | 8/1999 | Miyano et al. |
| 2009/0218305 A1 | | 9/2009 | Ikeguchi et al. |
| 2009/0312974 A1 | | 12/2009 | Douglas |

FOREIGN PATENT DOCUMENTS

| | | |
|---|---|---|
| DE | 100 42 699 A1 | 4/2002 |
| DE | 10 2009 036 480 A1 | 2/2011 |
| GB | 2 280 045 A | 1/1995 |
| JP | 7-081877 A | 3/1995 |
| JP | 8-192990 A | 7/1996 |
| JP | 9-156878 A | 6/1997 |
| JP | H11 060153 A | 3/1999 |
| JP | H1160153 * | 3/1999 |
| JP | 2003-063773 A | 3/2003 |
| WO | WO 02/070388 A1 | 9/2002 |
| WO | WO 2004/031066 A1 | 4/2004 |
| WO | WO 2009/138239 A1 | 11/2009 |

OTHER PUBLICATIONS

Kim et al., "Anti-Sway Control of Container Cranes: Inclinometer, Observer, and State Feedback," International Journal of Contol, Automation, and Systems, Dec. 2004, vol. 2, No. 4, pp. 435-449.

* cited by examiner

CRANE CONTROL

FIELD

The present invention relates to cranes, and especially to utilizing a rope angle measurement for a crane control.

BACKGROUND ART

Cranes are apparatuses which are intended for transferring loads, both in the open air and in closed environments. In manufacturing factories a crane is typically a bridge crane, movable along tracks by means of a bridge moving in the direction of the tracks and one or more trolleys moving along the bridge in the direction substantially perpendicular to the direction of the tracks, on which trolleys with one or more ropes, or corresponding hoisting means, such as belts and chains, are mounted. Although in an ideal situation each rope is vertical or almost vertical so that the load is directly under the trolley, in real life the ropes every now and then deviate from the ideal situation, and a need to know the actual rope angle, i.e. how much the rope has deviated, arises.

Several methods for finding out a deflection angle of a load are known. Typically they measure the deflection angle in an upward direction, i.e. from a lifting element, such as a hook, towards a trolley. For example, publication JP 9-156878 discloses a solution in which an optical fibre gyroscope is fitted to a rope suspension of a crane near the hook or other hoisting means to measure a shake angle value of a suspended load. Publication DE 10008235 discloses utilizing accelerometers, installed in the hook, to determine a deflection angle of a load by multiplying the output of an accelerometer by a correction value that corresponds to the reciprocal of the earth's acceleration. Publication DE 4238795 discloses that the hook may be equipped with a group of three accelerometers, or with a gyroscope or with an inclinometer, provided that the gyroscopes and inclinometers have appropriate accuracy to determine the deflection angle. An article by Yong-Seok Kim, Keum-Shik Hong, and Seung-Ki Sul, published in International Journal of Control, Automation, and Systems, vol. 2, no. 4, pp. 435-449, December and having the title "Anti-Sway Control of Container Cranes: Inclinometer, Observer, and State Feedback", suggests using, instead of a vision system, an inclinometer attached to a head block of a crane to detect a sway angle. A drawback of connecting a sensor in a hook to a controller in the crane requires either a long wiring, which is vulnerable to entanglement, or a wireless transmitter in the sensor and a corresponding receiver in the controller, and the powering of the sensor is also problematic. Another drawback is that a sensor located near the hook is rather vulnerable to external impacts, such as an accidental collision with the load when the load is attached to the hook.

WO 2009/138329 discloses a solution, which overcomes the above drawbacks since the measuring is performed downward. In the solution, when a load is transferred, a group of accelerometers, positioned on the rope in a part which is immobile or in the rope anchorage, calculates the displacement of a gripping element of the load in relation to a respective perpendicular Cartesian axis (x, y, z) by means of a rope deviation angle and a position of the hook in respect of the Z axis. The displacements on the three Cartesian axes of the hook of a lifting apparatus is described in WO 2009/138329 as an essential feature to the operations disclosed. A problem with the solution in WO 2009/138329 is that it ignores the fact that, especially when the rope deviation angle is measured by a sensor/sensors positioned in a vicinity of the rope anchorage, an acceleration or deceleration of the crane causes an error to the measured rope deviation angle.

SUMMARY

An object of the present invention is thus to provide a method and an apparatus for implementing the method so as to provide an easier to retrofit solution. The object of the invention is achieved by a crane, a method, kit and a computer program product which are characterized by what is stated in the independent claims. The preferred embodiments of the invention are disclosed in the dependent claims.

The invention is based on measuring a rope angle deflection by means of an angle sensor located at or adjacent to a trolley, and correcting, by compensating an error caused by a speed change, the rope angle feedback information thus obtained, and using the corrected rope angle feedback information to provide control information, like movement instructions.

An advantage provided by the compensating is that the error caused by the acceleration, for example, is corrected and erroneous angle information, and thereby erroneous control information, are avoided. In other words, the corrected rope angle feedback information gives the real rope angle in real time with sufficient accuracy even when the speed of the crane changes. Thus the crane control is based on real, correct information all the time. Brief description of the drawings In the following, embodiments will be described in greater detail with reference to accompanying drawings, in which FIGS. 1A, 1B and 1C show simplified crane arrangements according to embodiments;

Figure 3:
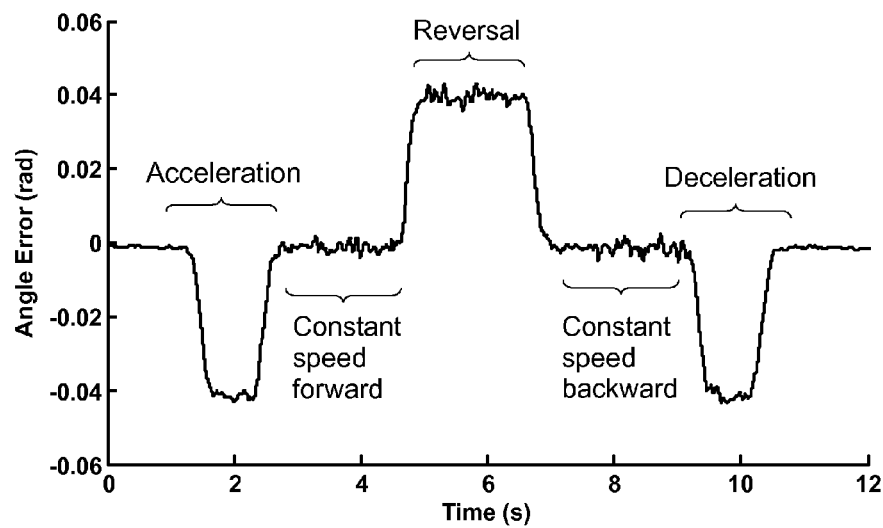
Figure 4:
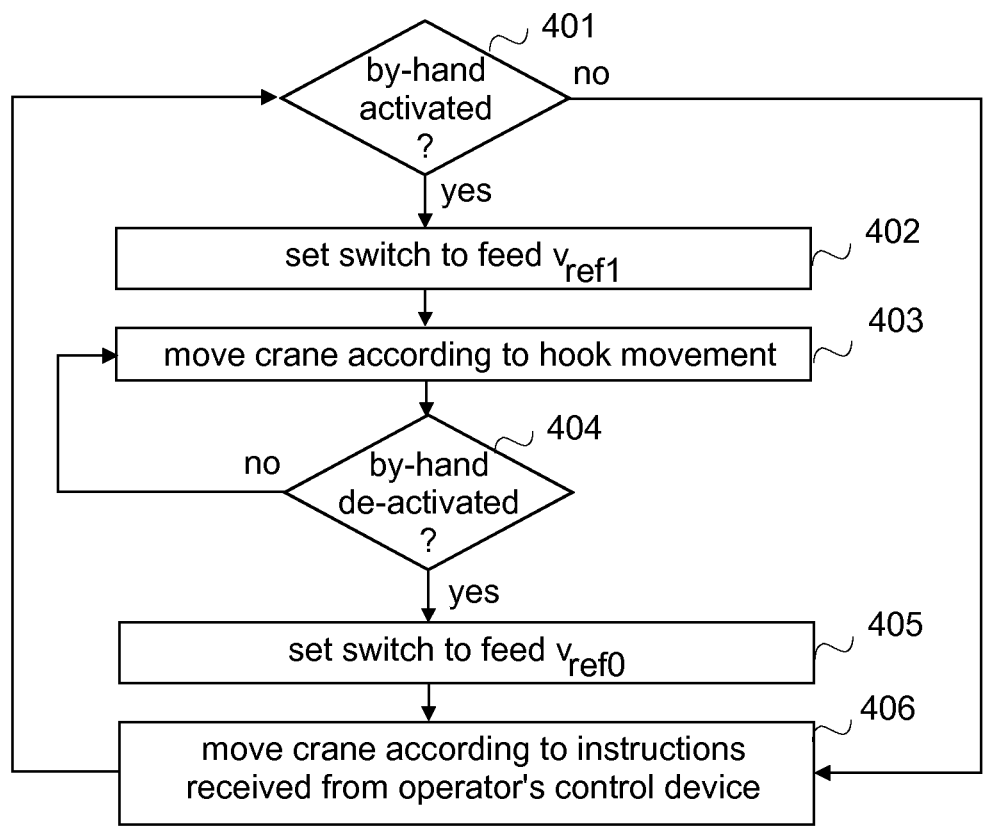
Figure 5:
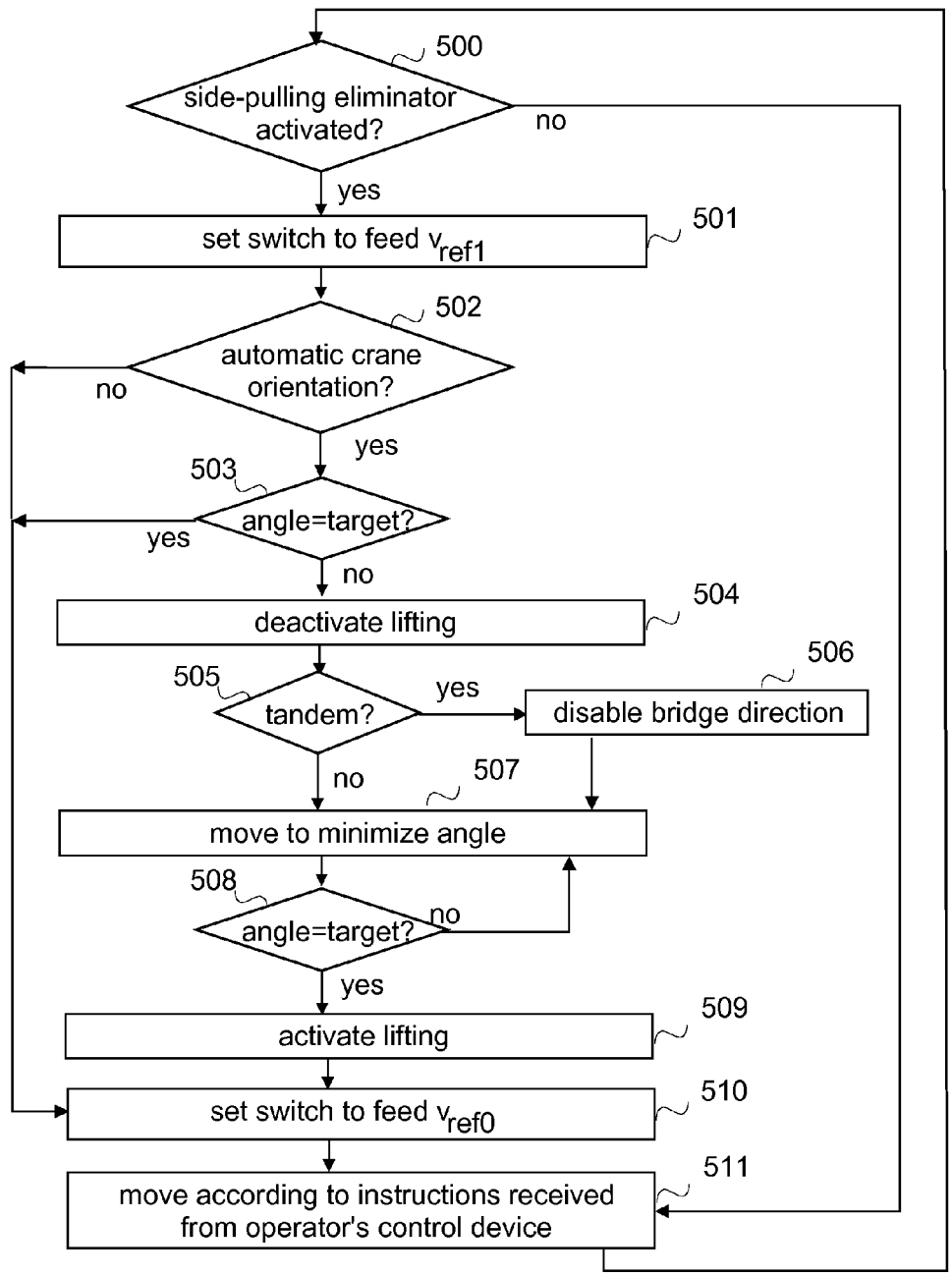
Figure 6:
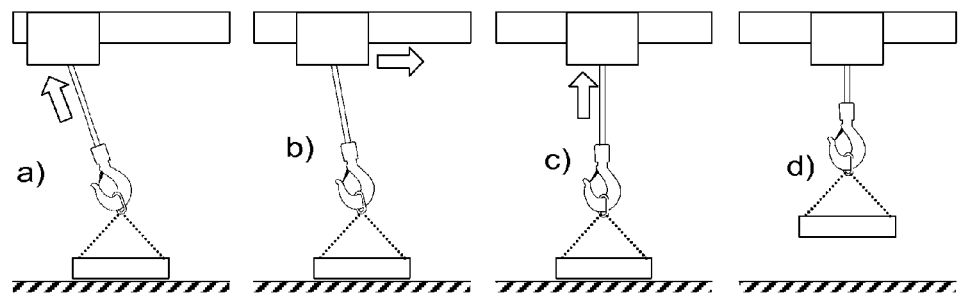
Figure 7:
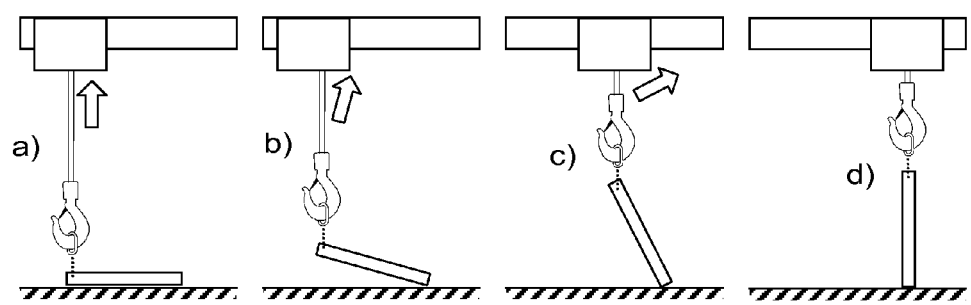
Figure 8:
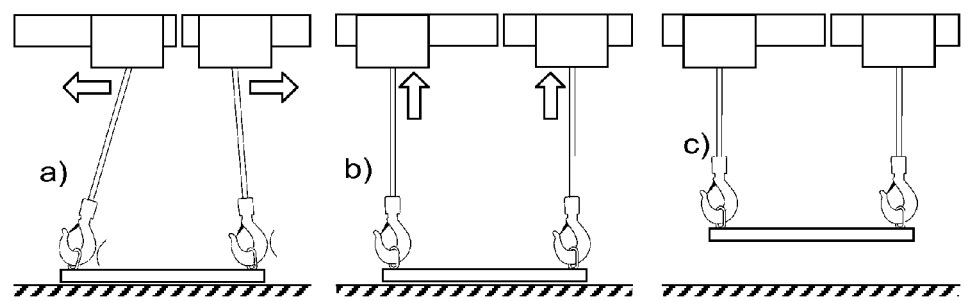
Figure 15A:
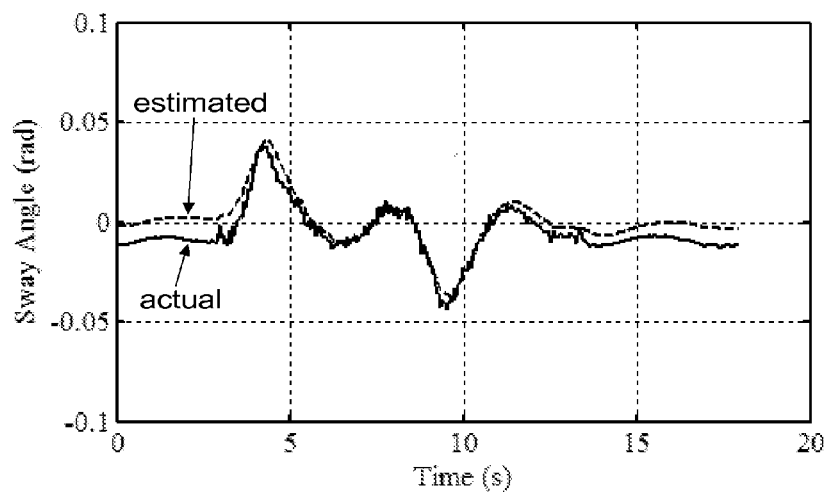
Figure 15B:
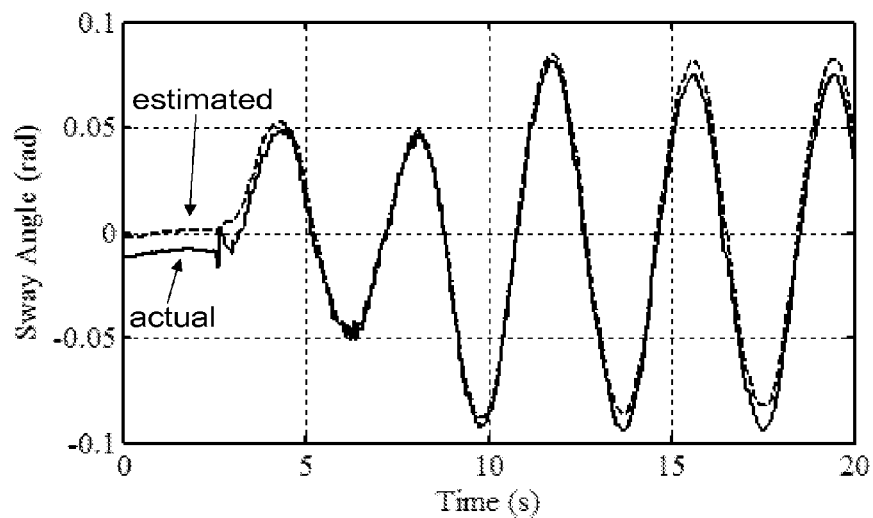
Figure 15C:
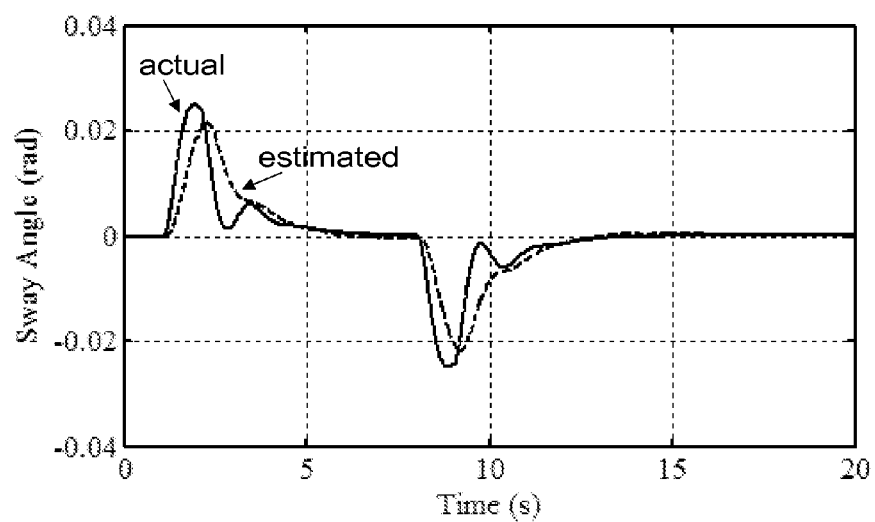
Figure 16:
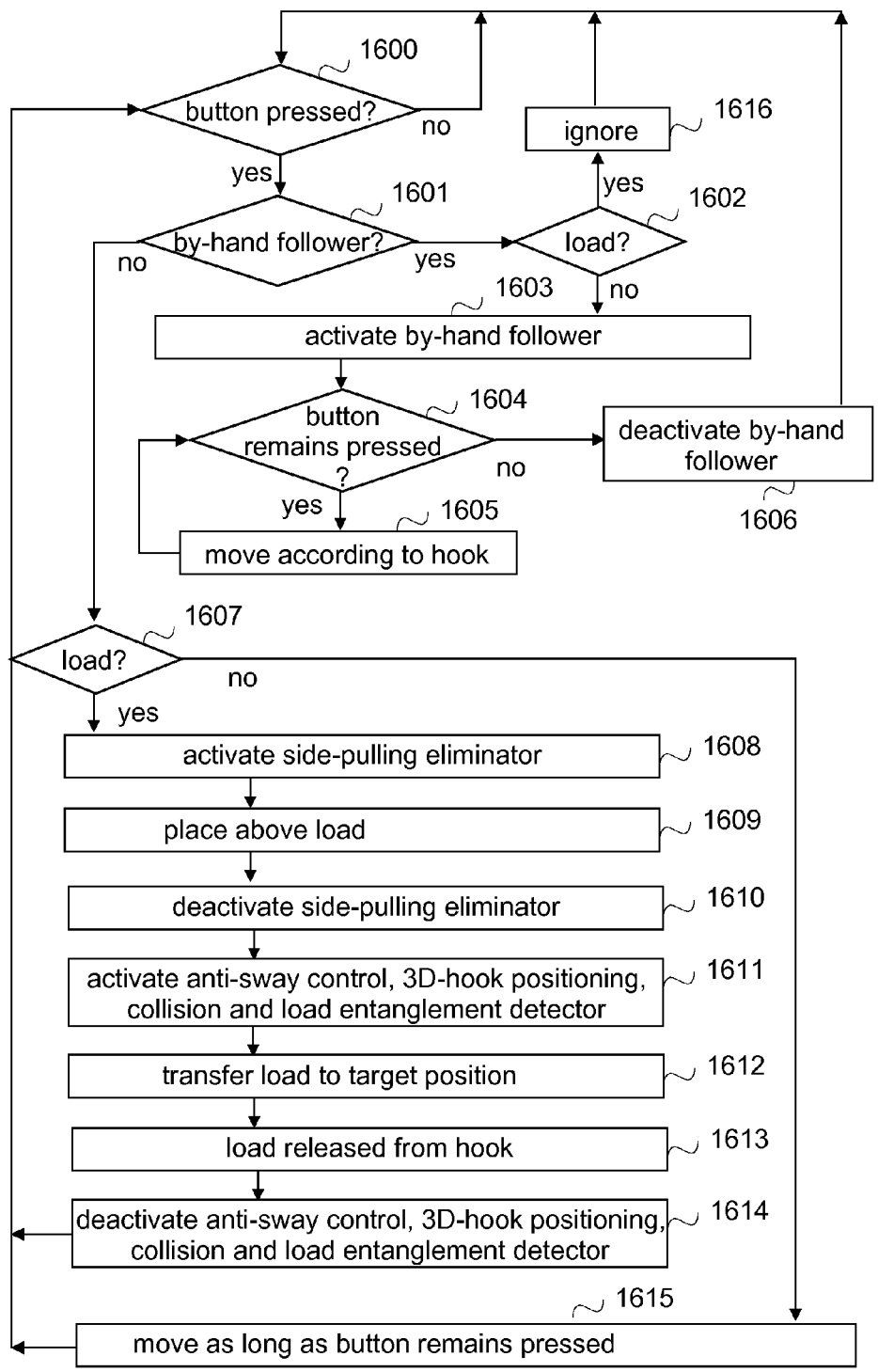

FIG. 3 discloses an example of how speed changes of a crane reflect to correctness of a measured angle;

FIGS. 4 and 5 are flow charts illustrating different controlling alternatives;

FIGS. 6, 7 and 8 are block diagrams illustrating controlling alternatives of FIG. 5; and FIGS. 9, 10, 11, 12, 13 and 14 are flow charts illustrating different controlling alternatives;

FIGS. 15A and 15B illustrate experimentation results and FIG. 15C a simulation result;

FIG. 16 illustrates a further controlling alternative; and

Figure 17A:
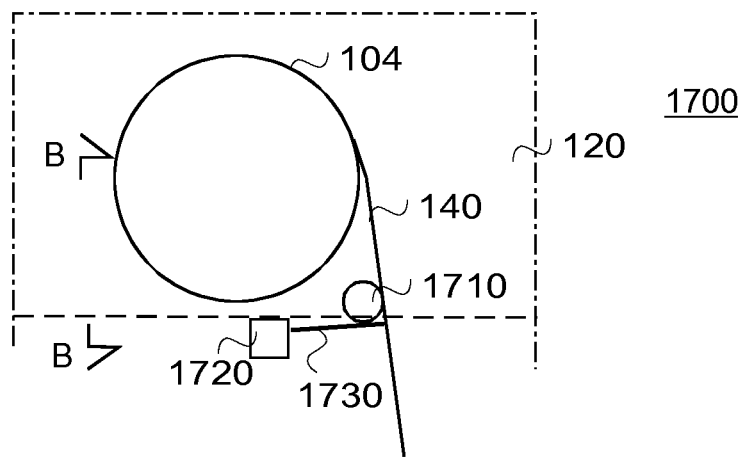
Figure 17B:
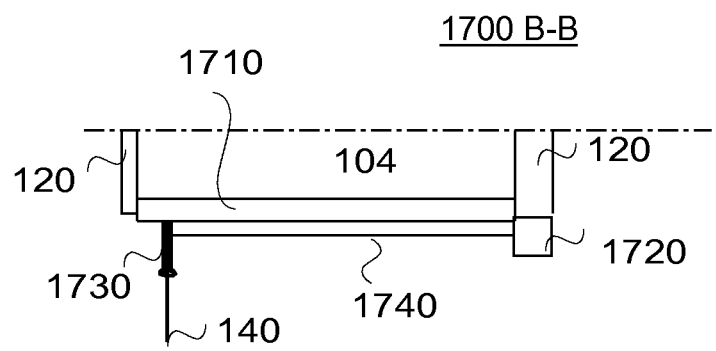

FIGS. 17A and 17B illustrate an arrangement how to estimate a rope length.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any crane, or crane arrangement in which a rope or ropes or corresponding means are used in hoisting, and the rope is mounted to a movable apparatus that is able to move at least along one axis. In the following, different examples and embodiments are described using an overhead bridge crane as an example without restricting the embodiments to such a crane, however. Other examples include standard and heavy duty cranes, such as a gantry crane, tower crane, slewing jib crane, ship-toshore (STS) container crane, offshore crane, crane with several hoists (crane having a trolley with several hooks and/or having more than one trolley), etc.

Figure 1A:
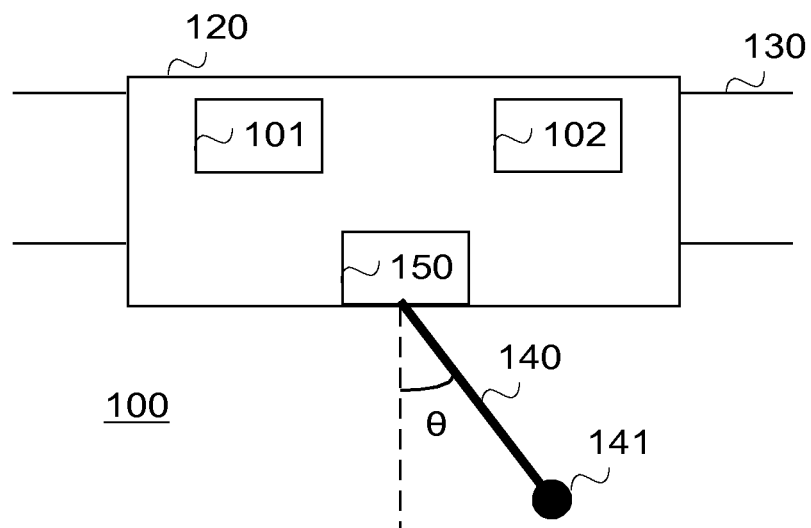
FIG. 1D shows an example of a bar.
Figure 1B:
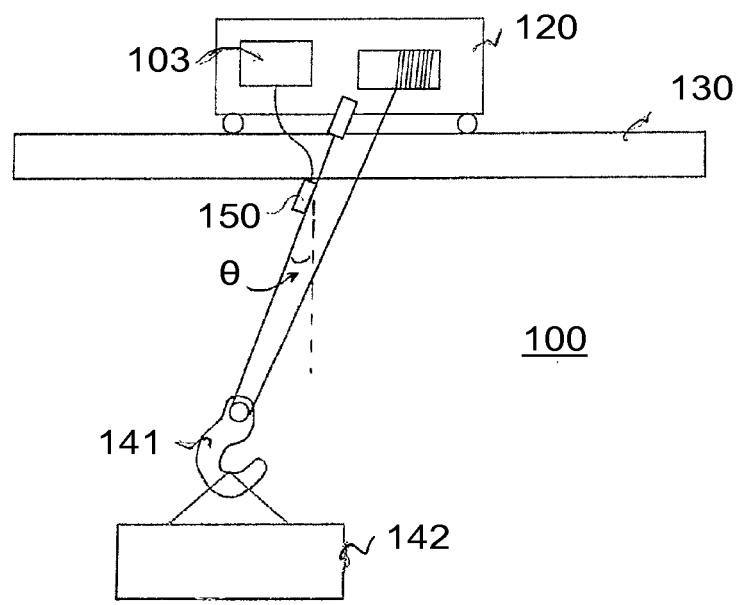
Figure 1C:
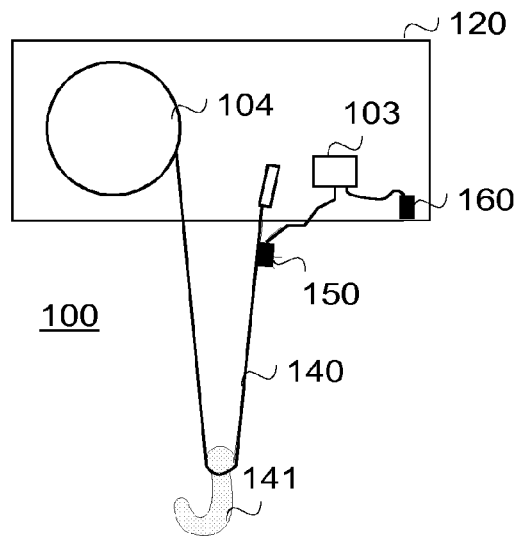

FIGS. 1A, 1B and 1C illustrate a simplified example of an electrical overhead crane, showing only some elements and functional entities of the crane. The connections shown in FIGS. 1A, 1B and 1C are logical connections; the actual physical connections may be different. It is apparent to a person skilled in the art that the crane also comprises other elements and functional entities. However, they are irrelevant to the actual invention and need not be discussed in more detail here. More specifically, the crane comprises, in addition to prior art means, also means for implementing control functionality described with an embodiment and it may comprise separate means for each separate function, or means may be configured to perform two or more functions and even to combine functions of different embodiments. In other words, the crane is configured to perform one or more of control functionalities described below with an embodiment, and it may be configured to perform functionalities from different embodiments.

Referring to FIGS. 1A and 1B, the crane 100 comprises a trolley 120 movable along a bridge 130. In the illustrated example of FIG. 1A, the trolley 120 comprises a controller 101 and a computing unit 102, the controller 101 for controlling the movement of the trolley and the movement of the bridge along tracks (not illustrated in FIG. 1), and the computing unit for processing rope angle feedback information and for transmitting the processing output to the controller 101. It should be appreciated that the computing unit 102 may also be used for other purposes and that the computing unit 102 may receive inputs from the controller 101. In the illustrated example of FIG. 1B, the controller and the computing unit are integrated into one unit 103. It should be appreciated that there may be a separate controller and/or a separate computing unit for the trolley and for the bridge, and that the controller and the computing unit may be integrated into one unit, and that the controller and/or the computing unit may be located somewhere else, like in an electrical cubicle in the bridge; even a separate controller for a trolley may be located in the bridge, and vice versa. The functionalities of the computing unit and the controller will be described in detail below.

A hoisting rope 140 is anchored to the trolley in a rope anchorage (attachment) point of the trolley. The hoisting rope may be any kind of a means, defined as a hoisting media in standards, with which loads can be lifted. Examples include a wire rope, a stripe, a chain, a cable, a flat-like belt having parallel steel wires tied or bonded by a rubber matrix, etc. The term "rope" used herein covers all hoisting media. The rope 140 comprises in its free end a hook 141 or corresponding gripping means which may carry a load 142. In FIG. 1A the hook is illustrated by a black dot 141 and no load is illustrated, whereas in FIG. 1B the load 142 is also illustrated.

The crane further comprises an angle sensor 150, mounted in the illustrated example of FIG. 1A directly on the anchorage of the rope, the anchorage being a point at which the rope end is under force of pressure caused by one or more wedge anchors and which aligns itself automatically to a rope inclination. It should be appreciated that the angle sensor may be mounted at any point which, when the rope angle changes, tilts accordingly. Other examples include mounting directly on the rope, as is illustrated in FIG. 1B, preferably at the rope's end anchored to the trolley, near the anchorage, or to a fastening means of the rope, like a support of a rope drum, or near the end of the rope to a point which is not rolled up to a drum, or, if the rope is not a fixed one, i.e. the rope may roll at its fastening end, to a sleeve-like structure surrounding the rope, in which case the sleeve-like structure follows the movement of the rope in relation to the trolley direction and/or the bridge direction and is fastened to a fixed part, like the trolley or the bridge, of the crane. Using the sleeve-like structure provides the advantage that the movement of the rope needs not be taken into account when deciding where to place the angle sensor; the sleeve-like structure and the angle sensor maintain their positions while the rope passing through the sleeve-like structure is rolled up to or down from the drum. The angle sensor 150 measures a rope angle $\theta$ (i.e. in this example a deviation angle of a rope from a vertical line) and sends rope angle feedback information to the computing unit 102 to be processed. As can be seen, the rope angle feedback information is measured towards the hook.

The arrangement illustrated in FIG. 1C differs from the arrangement in FIGS. 1A and 1B in that respect that, in addition to the angle sensor 150, the rope 140, the hook 141, the drum 104, the trolley 120 movable along the bridge, and the controller and the computing unit (depicted in the FIG. 1C by the one unit 103), the crane 100 further comprises an angle distortion sensor 160 mounted on one side of the trolley to measure from a trolley an angle distortion. The angle distortion sensor 160 measures the error induced by the speed change (acceleration/deceleration) of the trolley and/or the bridge, affecting the angle measurements, when accelerometers and inclinometers are used as angle sensors. The angle distortion sensor 160 is preferably a similar sensor than the angle sensor 150, i.e. an accelerometer or an inclinometer. Although here and below it is assumed that the angle distortion sensor 160 is mounted on the trolley, it should be appreciated that the angle distortion sensor 160 may be as well mounted on the bridge.

Depending on an implementation and/or the purpose for which the angle measurement is used, the angle sensor is configured to provide the rope angle $\theta$ information in respect of the trolley direction only, in respect of the bridge direction only, or in respect of both the trolley direction and the bridge direction.

It should be appreciated that the angle illustrated in FIG. 1A is a simplified example, and the actual angle measured depends on reeving and/or indirectly on the height at which the hook is located, for example. Hence, the rope angle $\theta$ information indicates how the rope angle differs from the angle by which the load is directly below the trolley and/or the bridge, the angle being called below a target angle. The load is directly below the trolley and/or the bridge when the centre of gravity of the load is directly below a hoisting point of the crane. The hoisting point depends on reeving, for example, and it is typically not a fixed point. The hoisting point may be the mid-point of the trolley and/or the bridge, but it may as well be some other point, as is known by a person skilled in the art. In embodiments where two or more trolleys are used to lift the load, such as the one illustrated in FIG. 8, the load is interpreted to be directly below the trolley when the rope angle equals to the target angle in the movement direction of the trolley.

Below, different exemplary embodiments are described using an inclinometer as the angle sensor. An advantage provided by the feature is that installing the inclinometer at the fixed end is easy and simple in various types of cranes, the inclinometer itself providing a reliable and cost efficient sensor. Further, the inclinometer is not sensitive to the environment and changes in the environment. For example, a camera is sensitive to changes in the environment, like rain, snow, humidity, fog, lighting conditions, etc. Further, using the inclinometer capable of differentiating the two directions (bridge and trolley) provides the advantage that the information is obtained with a single sensor; there is no need to have a sensor for each direction. However, it should be appreciated that other sensors, like accelerometers, and/or gyroscopes may be used to determine the angle.

Figure 1D:
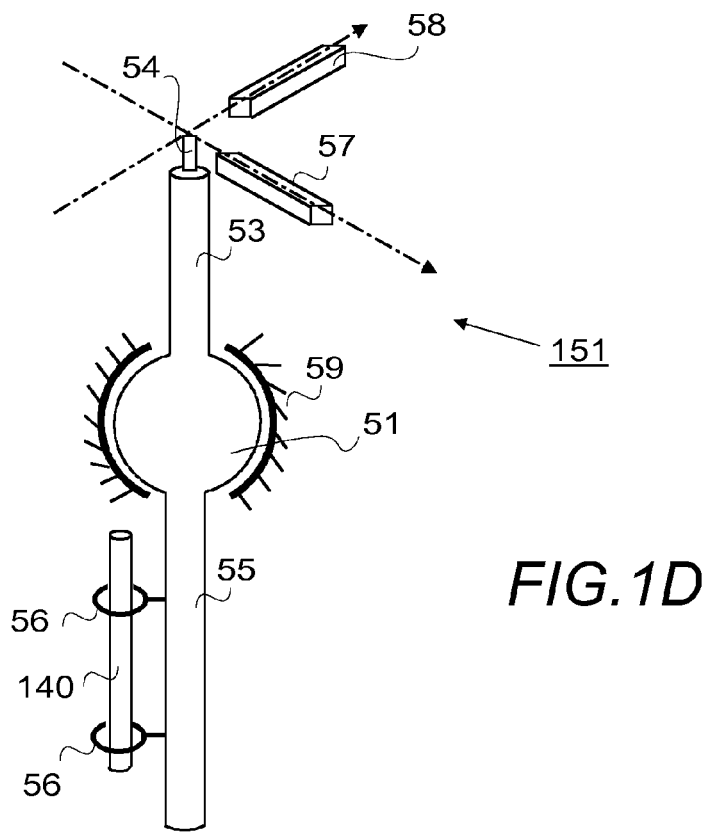

Yet another angle sensor may be provided by a hinge- or knuckle-jointed bar (a pivoted bar) 151, an example of which is shown in FIG. 1D. A casing 59 of a knuckle 51 dividing the bar into two portions is mounted on the trolley, and attached to the rope 140 by means of guides 56. A pair of guides 56 may provide an effect of a sleeve-like structure surrounding the rope 140. This structure provides a benefit that the rope 140 may run through the sleeve-like structure, and the structure can be installed below rope drum. The knuckle is preferably ball-shaped so that it is flexible in x- and y-directions. The bar 151 is directed downwards and mounted in such a way that the upper end of the bar 53 leans on force sensors, for example. The force sensors 57, 58 detect x-y-movement of the upper end 53, or more precisely, a pointer 54 at the upmost end, thereby providing means for determining the rope angle. It should be appreciated that instead of, or in addition to, the force sensors, other types of sensors detecting movement of the upper end of the bar may be used. An example of such a sensor is a displacement sensor. Another example of such a sensor is a sensor comprising an electrical/optical arrangement which has a laser, for example, in the pointer 54. In the arrangement, a ray of light is directed upwards on a surface, which is scanned to read x- and y-coordinates, and on the basis of the coordinates, the rope angle is calculated. The surface which is scanned may be a plane or a hemispherical surface, for example. The arrangement is preferably covered by a casing to protect it against dust and other sources of light. The casing may provide itself the surface to be scanned, for example on top of the measuring arrangement. The point where the knuckle 51 is located divides the bar into the upper end 53 and the lower end 55 thereby producing a mechanical ratio of intensification. The mechanical ratio of intensification is selectable by selecting the point where the knuckle 51 is located with respect to the relation of the lengths of the upper end 53 and the lower end. In other words, the movement detection of the bar may be intensified by positioning the hinge/knuckle/pivot point somewhat downwards in the bar. The location of the point is freely selectable, and the actual amount of "somewhat" depends on the type of the movement detection sensors. If the length of the bar is about 300 to 500 mm, the point may, for example, be located so that ¼ of the length is above it and the rest ¾ below. It is to be appreciated that the length of the upper end 53 may be zero, i.e. the whole length of the bar 151 may be the length of the lower end 55 added with the diameter of the knuckle.

In the illustrated examples, it is assumed that the computing unit and/or the controller perform the control functionality of the crane, either by themselves or with one or more additional units described with an example. For example, the crane typically comprises different interfaces, like displays, receivers and transmitters. Each of the units may be a separate unit or integrated to another unit, or the units may be integrated together.

The computing unit and/or the controller, or a corresponding apparatus/circuitry/assembly/arrangement may be implemented by various techniques. For example, the computing unit and/or the controller may be implemented in hardware (one or more apparatuses/circuitries/assemblies), firmware (one or more apparatuses/circuitries/assemblies), software (one or more modules), or combinations thereof. For a firmware or software, implementation can be through units/modules (e.g. procedures, functions, and so on) that perform the functions described herein.

The computing unit and/or the controller may be configured as a computer or a processor, such as a single-chip computer element, or as a chipset, or as a microcontroller including at least a memory for providing a storage area used for arithmetic operation and an operation processor for executing the arithmetic operation, or a programmable logic controller, or a frequency inverter. The computing unit and/or the controller may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed to carry out one or more functions of one or more embodiments. An embodiment provides a computer program embodied on any client-readable distribution/data storage medium or memory unit(s) or article(s) of manufacture, comprising program instructions executable by one or more processors/computers, which instructions, when loaded into a device (an apparatus), constitute the computing unit and/or the controller. Programs, also called program products, including software routines, program snippets constituting "program libraries", applets and macros, can be stored in any medium, and may be downloaded into the device. The data storage medium or the memory unit may be implemented within the microcontroller/processor/computer or external to the processor/computer, in which case it can be communicatively coupled to the microcontroller/processor/computer via various means as is known in the art.

The memory may be volatile and/or non-volatile memory, for example EEPROM, ROM, PROM, RAM, DRAM, SRAM, firmware, programmable logic, double floating-gate field effect transistor, etc. and it typically stores content, data, or the like, and the memory may store also other information, as will be explained below. Further, the memory may store computer program code such as software applications (for example, for the editing unit or the data publishing unit) or operating systems, information, data, content, or the like for the processor to perform steps associated with operation of the access point node and/or the user equipment in accordance with embodiments. The memory may be, for example, a random access memory, a hard drive, another fixed data memory or storage device or any combination thereof. Further, the memory, or part of it, may be removable memory detachably connected to the access point node and/or the user equipment.

An embodiment provides a kit that is retrofittable, i.e. the kit may be, in addition to an arrangement or equipment mounted on a crane when the crane is manufactured, a repair kit. The repair kit can be mounted, for example, during maintenance or rebuild of a crane, to upgrade the crane to comprise some intelligence that improves its characteristics. The downtime of the crane caused by the upgrading is short, especially when the upgrading is done/performed during maintenance. The kit comprises the angle sensor to be applied to an appropriate location on the crane, the location enabling angle measurement in the downward direction, as described above. The kit further comprises the computing unit and the controller, for example in the form of a pre-programmed frequency converter, an input interface between the computing unit to receive angle measurements from the angle sensor, and an output interface to send instructions, i.e. control information, to the crane, or more precisely to a crane mechanism. The term "crane mechanism" covers here any unit/module/assembly to which the control information is transmitted to control the crane. Examples of such units/modules/assemblies include a motion control system, a motor, a drive arrangement, such as a combination of a motor, gear and drum, and a frequency converter receiving control information via a bus or via a digital input/output interface, or via an analog input/output interface. The kit may be customized according to a crane type and/or foreseen environment (heat, humidity, indoors, outdoors) and/or regulations/standards in a country where the crane is to be located, or is located, when the crane is upgraded. When the kit is used for upgrading a crane, connector types may be optimized and/or the kit may be provided as a plug-and-play kit, thereby shortening the downtime.

The functionalities of the computing unit and the controller will be described in detail below by means of a controlling module comprising an integrated computing unit and controller. It should be appreciated that the controlling module may also receive other inputs than those described below, depending on the controlling purpose and its requirements. However, the other inputs are irrelevant for the disclosed embodiments and therefore are not described in detail here.

FIGS. 2A, 2B, 2C, 2D and 2E are block diagrams of apparatuses/circuitries/assemblies according to embodiments, illustrating different circuit couplings. As can be seen, each of them provides a closed loop created by means of feedback loop. The feedback loop always comprises rope angle feedback information, and in some embodiments also speed feedback information, or corresponding information. Thus, a cost efficient, easy-to-mount and robust closed loop is obtained.

Further, it should be appreciated that there may be separate controlling modules for the bridge and for the trolley, especially in implementations in which the angle signal is received separately for the bridge and for the trolley.

In the illustrated examples it is assumed that the crane comprises the inclinometer providing the angle feedback information in the form of the angle signal, a controlling module for providing control information and a crane mechanism. Herein, the crane mechanism covers, in addition to conventional mechanical units like motors and brakes, also other units, like a motor drive, required for moving the trolley and/or the bridge according to control information.

Figure 2A:
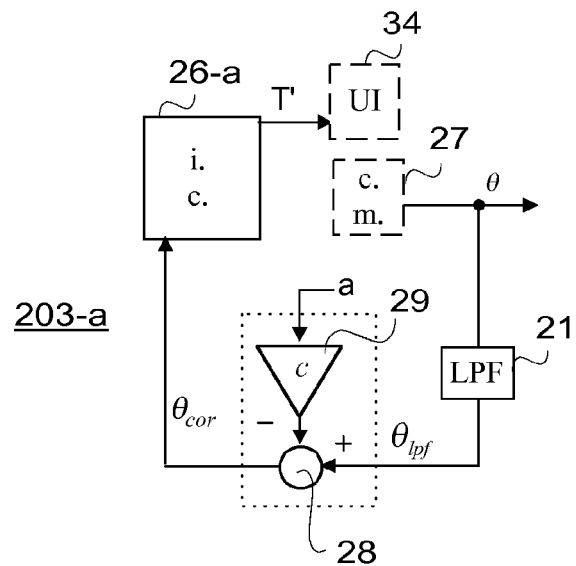
FIGS. 2A, 2B, 2C, 2D and 2E are block diagrams illustrating different embodiments.

FIG. 2A is a block diagram illustrating a model of an example of a controlling module.

The model illustrates an example in which crane control utilizes directly the measured and corrected rope angle information. In the illustrated example the crane control comprises an inclination controller configured to detect whether or not the measured rope angle is the same as the target rope angle and to provide corresponding control instructions, the control instructions in the example not comprising movement instructions generated by the controlling unit. It should be appreciated that a corresponding arrangement may be used for other purposes, as well.

Referring to FIG. 2A, a measured rope angle signal θ is received in the controlling module 203-$a$ via an interface (not illustrated in FIG. 2A) from the inclinometer, and inputted to a low-pass filter 21. The low-pass filter 21 dampens high-frequency noise from the measured rope angle signal, and outputs a filtered signal $\theta_{lpf}$. To compensate an error caused by the crane acceleration to the measured rope angle, the filtered signal $\theta_{lpf}$ is inputted to an acceleration compensation unit which comprises a gain 29 and a subtractor 28, surrounded by a dotted line in FIG. 2A. The subtractor 28 subtracts from the filtered signal a result of compensation gain c multiplied in the gain 29 by an acceleration "a" of the trolley or the bridge. The parameter value of the acceleration "a" may be obtained by any suitable means, for example directly from an additional acceleration sensor, or by determining the value "a" from preceding control information, or it may be determined from speed instructions provided beforehand, or obtained as an output of a differentiator calculating a time derivate from a measured speed. The compensation gain c is determined experimentally, as will be described below with the description of FIG. 3. The corrected angle value $\theta_{cor}$ thus obtained is then inputted to an inclination controller (i. c.) 26-$a$. The inclination controller 26-$a$ is connected to a user interface (UI) 34 to provide the user interface by a processed filtered signal T' and, for example, to alert the user and/or to provide control instructions to the user.

The connection between the user interface and the inclination controller may be a wired connection or a wireless connection.

It should be appreciated that an inclination controller may also receive other measured information as input, depending on an implementation of the application.

Figure 2B:
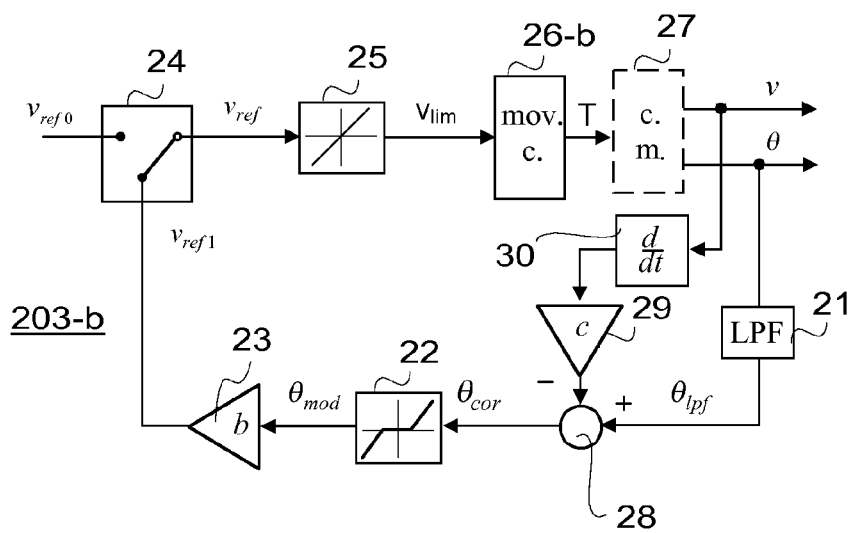

FIG. 2B is a block diagram illustrating a model of a further example of a controlling module 203-$b$. The model contains an acceleration compensation unit utilizing the principles described above, and it differs from the model of FIG. 2A in that it processes the rope angle feedback information to provide information for crane movement instructions.

Referring to FIG. 2B, a measured rope angle signal θ is received in the controlling module 203-$b$ via an interface (not illustrated in FIG. 2B) from the inclinometer, and inputted to a low-pass filter 21. The low-pass filter 21 dampens high-frequency noise from the measured rope angle signal, and outputs a filtered signal $\theta_{lpf}$. The filtered signal is then inputted to the acceleration compensation unit formed by the gain 29 and the subtractor 28. In the illustrated example, the speed of the crane is used to obtain the acceleration value "a" by means of the differentiator 30. The corrected angle information $\theta_{cor}$ thus obtained is inputted to a dead zone unit 22 to be modified in order to avoid unexpected movements due to low-frequency noise and an offset error that may still be in the angle feedback. The dead zone unit 22 outputs a modified angle signal $\theta_{mod}$, which is then multiplied by a gain b 23 to obtain a first reference speed $v_{ref1}$ for the crane. The value of gain b depends on the type of the crane in question, and preferably the value is set in such a way that the trolley and/or the bridge reaches a suitable speed. Depending on the switch 24 settings, either the first reference speed $v_{ref1}$, based on the angle feedback, or a normal reference speed $v_{ref0}$ is inputted to a rate limiter 25 of the crane as a reference speed $v_{ref}$. In the illustrated example, the switch 24 is set to input the first reference speed to the rate limiter. The normal reference speed $v_{ref0}$ is formed by the command of the operator and received via an interface (not illustrated in FIG. 2B) from an operator's control unit, like a joystick, a device equipped with control buttons, a radio, a pendant controller or a touch screen. The rate limiter 25 then provides the limited speed $v_{lim}$ to a movement controller 26-$b$, which then provides a moving instruction signal T, like a torque, to the crane mechanism (c.m.) 27, illustrated by dashed lines.

Figure 2C:
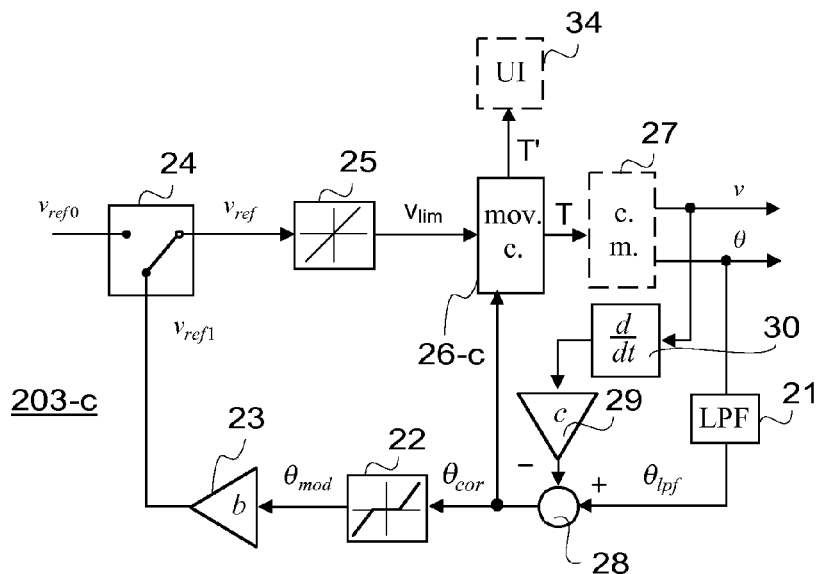

FIG. 2C is a block diagram illustrating a model of a yet another example of a controlling module 203-$c$. It is a combination of the controlling module in FIG. 2A and the controlling module in FIG. 2B, and therefore it is not explained in detail here, and it differs from the model of FIG. 2B in that the movement controller 26-$c$ receives as inputs the limited speed $v_{lim}$ and a corrected measured rope angle $\theta_{cor}$ information. The controller 26-$c$ is configured to implement one or more of the below-described control features. In other words, the controller 26-$c$ comprises the movement controller and/or the inclination controller. Further, the controller 26-$c$ is connected to one or more user interfaces (UI) 34 with corresponding connections, fixed or wireless. The controller 26-$c$ then provides a moving instruction signal T, like a torque, to the crane mechanism (c.m.) 27.

Although in the examples of FIGS. 2B and 2C, the corrected signal Boor is modified by a dead zone unit, other modification methods and functions may be used instead of the dead zone unit. One alternative is to use a step function. The step function is especially suitable for bridges and/or trolleys that do not have stepless speed variation.

Figure 2D:
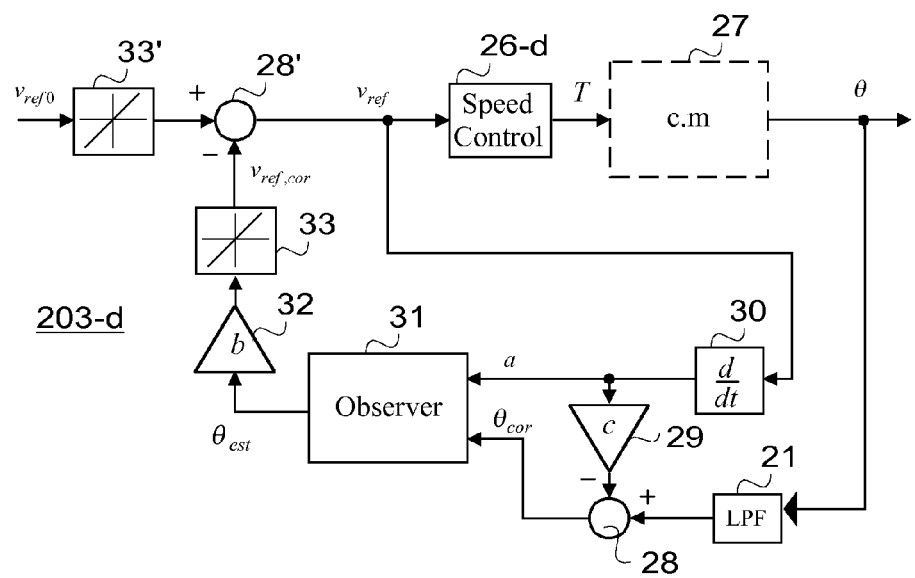

FIG. 2D is a block diagram illustrating a model of a yet another example of a controlling module. The controlling module is a closed loop module created by means of a feed-forward and feedback loop, i.e. feedback received in the rope angle information that takes into account other variables, such as a reference speed given by the operator, and other information not illustrated in this example, like the measured crane speed. The illustrated example may also be used in an open-loop type of a voltage/frequency-controlled controlling module, like in a motor drive.

Referring to FIG. 2D, a measured rope angle signal θ is received in the controlling module 203-d via an interface (not illustrated in FIG. 2D) from the inclinometer, and inputted to a low-pass filter 21. The low-pass filter 21 dampens high-frequency noise from the measured rope angle signal, and outputs a filtered signal $\theta_{lpf}$. To compensate an error in the measured angle, which is due to crane acceleration, the filtered signal $\theta_{lpf}$ is inputted to an acceleration compensation unit which in the illustrated example comprises a gain 29 and a subtractor 28 subtracting from the filtered signal a result of compensation gain c multiplied in the gain 29 by acceleration "a" of the trolley or the bridge. In the example, the acceleration "a" is an output of a differentiator 30 that receives reference speed information as an input. The corrected angle information $\theta_{cor}$ thus obtained is then inputted to a sway observer 31. The sway observer receives the acceleration "a" as another input, and outputs an estimated sway angle $\theta_{est}$. The estimated sway angle is an input of a P-controller 32 with a gain b. The gain b is described above with FIG. 2B. The P-controller output $v_{ref,cor}$ (reference speed corrector) is rate-limited by a rate-limiter 33, and then subtracted from a rate-limited (by a rate-limiter 33') original reference speed $v_{ref0}$ in a subtractor 28'. The reference speed $v_{ref}$ thus obtained is inputted to a speed control 26-d, which provides as output a moving instruction signal T, like a torque, to the crane mechanism (c.m.) 27.

In the example of FIG. 2D, the speed control 26-d is able to produce an output signal directly based on the speed reference $v_{ref}$, and the speed reference $v_{ref}$ is an analog signal fed into the analog input interface of the speed control (such as a frequency converter) or communicated via a fieldbus from a computing unit (such as a programmable logic controller PLC) to the bus input interface of the speed control. Alternatively, the controlling module can be located in the frequency drive, in which case the sensor values are provided to the drive via an analog and/or digital interface of the drive.

The sway observer 31 removes an offset from a measured sway angle and is defined by the following Formulas (1) and (2):

$$\frac{d\omega_{est}}{dt} = \frac{1}{H_{est}}(a - g\theta_{est}) + k_1(\theta_{cor} - \theta_{est}) \quad (1)$$

$$\frac{d\theta_{est}}{dt} = \omega_{est} + k_2(\theta_{cor} - \theta_{est}) \quad (2)$$

wherein
$\omega_{est}$ is estimated sway angular speed;
$H_{est}$ is an estimated rope length;
a is the acceleration value;
g is gravitational acceleration;

$k_1$ and $k_2$ are observer gains;
$\theta_{est}$ is an estimated sway angle; and
$\theta_{cor}$ is the corrected angle information.

$H_{est}$ may be any reasonable value in the range of minimum and maximum lifting height, including a constant value, even when the actual rope length varies. The rope length may be given as a system parameter. A reasonable value for $H_{est}$ is, for example, the rope length that is typically used when moving loads with the crane in question. Instead of a constant value, a measured or an estimated rope length may be used as $H_{est}$. The rope length may be measured by any measurement method and by several means. An example includes one or more encoders mounted on a hoisting motor. A further example includes an accelerometer mounted on the drum at a rotational axis or in a pulley. Yet further examples with which the rope length may be estimated are based on measuring the hook's vertical position with respect to the crane, for example by ultrasonic sensors (a transmitter on the hook and a receiver on the trolley), by lasers (a distance between the trolley and the hook), by using a radio-frequency based distance measurement (preferably by ultra-wide band, UWB, technology with a transmitter in the hook and a receiver in the trolley), or by normal or stereo- or time-of-flight cameras mounted on the trolley looking downwards towards the hook. A further example is to detect a separation point/feeding point in the upward drum groove by means of couple of inductive sensors or one camera. Yet another option is to obtain the height from the drive control pulses with a calibration point at a certain lifting height. The height may also be estimated by integrating the lifting speed. FIGS. 17A and 17B disclose a simple system to obtain a rather accurate estimate of the height by means of a draw-wire sensor that measures a rope guide position on the drum.

Formula (1) is used for calculating the estimated sway angular speed $\omega_{est}$ by integrating the Formula (1). Then the Formula (2) is used for calculating the estimated sway angle $\theta_{est}$ by integrating the Formula (2).

It should be appreciated that although the sway observer is described above as a continuous observer, in an actual implementation the sway observer may be discretized. Any appropriate discretization method may be used.

For example, following values may be used with FIG. 2D: if the bottom part of the crane bridge is at 12 meters from the ground, and the hook is normally at the height of 2 meters from the ground when moving loads, a reasonable value for the estimated rope length may be 10 meters, and the sway control gain b may be 8 m/s, and the observer gain $k_1$ may be 0 and the observer gain $k_2$ may be 2 $s^{-1}$.

Figure 2E:
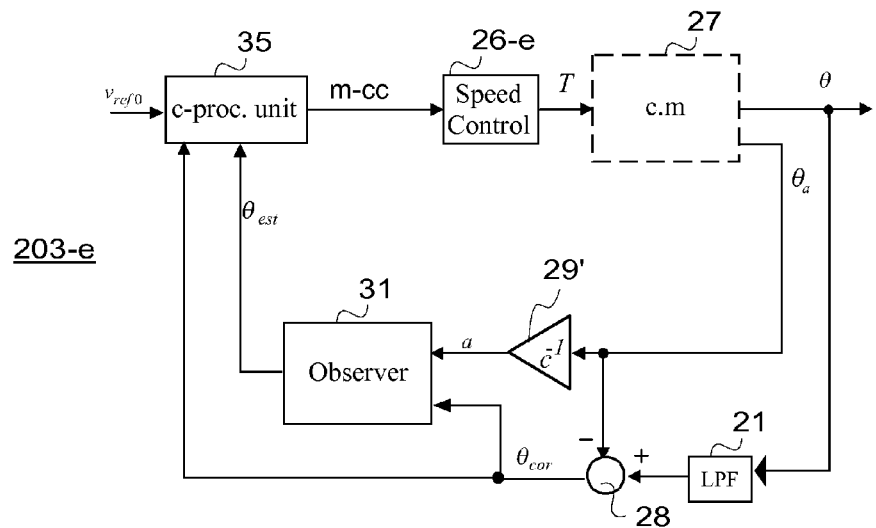

FIG. 2E is a block diagram illustrating a model of a yet another example of a controlling module. The controlling module is a closed loop module created by means of a feed-forward and feedback loop, i.e. feedback received in the rope angle information that takes into account other variables, such as a reference speed given by the operator, and information received from the angle distortion sensor measuring the effect of trolley and/or bridge speed changes on the angle sensor. Other information not illustrated in this example may also be taken into account. The illustrated example may also be used in an open-loop type of a voltage/frequency-controlled controlling module, like in a motor drive.

Referring to FIG. 2E, a measured rope angle signal θ is received in the controlling module 203-e via an interface (not illustrated in FIG. 2E) from the angle sensor, and inputted to a low-pass filter 21, which is preferably a second order low-pass filter. The low-pass filter 21 dampens high-frequency noise from the measured rope angle signal, and outputs a filtered signal $\theta_{lpf}$. To compensate an error in the measured angle, which is due to crane acceleration, the filtered signal $\theta_{lpf}$ is inputted to an acceleration compensation unit which in the illustrated example comprises a subtractor 28 subtracting from the filtered signal angle distortion information $\theta_a$ obtained from the angle distortion sensor mounted on the trolley (and not measuring the rope angle). The corrected angle information $\theta_{cor}$ thus obtained is then inputted to a sway observer 31. The sway observer receives the acceleration "a" as another input, the acceleration "a" being in the arrangement a result of compensation gain $c^{-1}$ multiplied in the gain 29' by the angle distortion information $\theta_a$ from the trolley. As described above, the sway observer outputs an estimated sway angle $\theta_{est}$, calculated using Formulas (1) and (2). The estimated sway angle is an input of a command processing unit (c-proc. unit) 35. In the illustrated example other inputs to the command processing unit 35 are control commands from user $v_{ref0}$, and the corrected angle information $\theta_{cor}$. The command processing unit 35 uses the control commands from the user and either the estimated sway angle $\theta_{est}$ or the corrected angle information $\theta_{cor}$, as will be described below with the description of FIG. 4, FIG. 5 and FIG. 14. Modified control commands m-cc outputted from the command processing unit are inputted to a speed control 26-e, which provides as output a moving instruction signal T, like a torque, to the crane mechanism (c.m.) 27.

In the example of FIG. 2E, the control interface of the speed control 26-e is digital, and the speed control receives the modified control commands m-cc in a specific digital format. The benefit of this approach is that in many existing cranes the control commands from the user (from pendant, radio or joystick control) are fed into the frequency drives via such a digital interface. Thus upgrading a crane to comprise a controlling module illustrated in FIG. 2E to provide new control functionalities to an existing crane is cost efficient since the speed control (frequency converters) does not need to be replaced, as the new command processing unit can communicate with the existing drives via the digital interface. Furthermore, there is no need to replace the existing cabling between the unit receiving user commands and the frequency drives—only the command processing unit is added in between to add intelligence to the system.

One of widely used digital control methods is an electronic potentiometer (EP) control. In the EP control, each crane direction of the movement is controlled with three digital lines, which all have three states. These states also correspond to the two-step push-buttons in the operator's controller. The first state is "stop" (button released). This state activates deceleration of movement until the movement has fully stopped. In "accelerate" state (button fully pressed), acceleration is activated until a maximum speed is reached. In the "slow" state (button half-pressed), the movement is either accelerated or decelerated until a preset slow speed is reached. The three lines used for the digital control are S1 (direction 1), S2 (direction 2) and AC (accelerate). Directions 1 and 2 are opposite, so for example, a trolley may move either in the direction 1 or 2 (along the bridge, forward or backward). Below with the description of some functionalities, the following notation will be used:

S1=1: direction 1 is selected
S1=0: direction 1 is deselected
S1=s1: direction 1 selection is kept in previous mode
S2=1: direction 2 is selected
S2=0: direction 2 is deselected
S2=s2: direction 2 selection is kept in previous mode
AC=1: activate accelerate state
AC=0: activate stop state
AC=ac: activate slow state For example, a control signal (S1=1, S2=0, AC=1) means that a movement towards the direction 1 will be accelerated. Another control signal (51=s1, S2=s2, AC=ac) means that the movement direction is not changed and the current direction is set to slow state (to slow speed).

In another example, based on the example of FIG. 2E, the corrected angle information is not inputted to the command processing unit 35. In a yet other example, based on the example of FIG. 2E, the sway observer 31 and the gain 29' are left out and no estimated sway angle $\theta_{est}$ is calculated and inputted to the command processing unit 35.

It should be appreciated that instead of receiving the angle distortion information, the acceleration value may be obtained as according to any of the ways described above with FIGS. 2A to 2D.

FIG. 3 shows results obtained by an experimental arrangement and illustrates how a change in a crane speed influences the correctness of the measured angle. In the experimental arrangement, the inclinometer was firmly attached to the trolley so that the actual angle could not change. The trolley was accelerated forward with an acceleration of 0.4 m/s², driven forward at a constant speed, reversed, driven backward at a constant speed and finally decelerated to standstill. Although the actual angle remained the same, the measured angle value varied. The curve in FIG. 3 shows the angle error, i.e. the angle distortion. As can be seen, the absolute value of the angle error is approximately 0.04 radians during the acceleration, reversal and deceleration. Thus, the acceleration compensation unit may be used for correcting angle errors caused by any speed change. The angle error obtained by the experimental arrangement may be used to determine the acceleration compensation gain c for sensors used correspondingly. In the illustrated example, the acceleration compensation gain c is selected to be 0.1 s²/m ((0.04 rad)/(0.4 m/s²)) =0.1 s²/m.

Below, functionalities of different kinds of controlling modules, or more specifically different kinds of control features, utilizing the feedback information obtained as described above are described. Those based on the controlling module disclosed with FIG. 2B or FIG. 2C are described with FIGS. 4, 5 to 8, those based on the controlling module disclosed with FIG. 2A are described with FIGS. 9 and 11, those based on the controlling module disclosed with FIG. 2C are described with FIGS. 9 to 11, and those based on the controlling module disclosed with FIG. 2D or FIG. 2E are described with FIGS. 12 to 14. However, it should be appreciated that every feature may use the structure disclosed with FIGS. 2D and 2E. FIG. 16 is based on one or more controlling modules described with FIGS. 2A to 2E.

In some below described functionalities information on a rope length may be needed. However, as stated above, it suffices that it is an estimate; even a rough estimate of the rope length may be used.

By-Hand Follower

The by-hand follower may be called "move the crane as the hook moves", or "walk-with-the crane". It enables driving the crane by towing the hook, and thereby the crane, by hand. For example, when a hook is empty, its positioning by hand will be faster and more accurate compared to positioning by an operator control device, such as a conventional joystick or push-button control. Further, when the hook holds a load, there are situations in which positioning by hand is more user-friendly than positioning by the operator control device, and it reduces crane accidents, especially those in which the operator holds the load with one hand and operates the control device with the other hand. The operator is often beside the hook and could manipulate the bridge and/or the trolley by simply "dragging" or pushing the hook or load, thus fully focusing on the load and not looking at the display displaying the coordinates of the crane control. Especially, if the display is located in the bridge, the operator can look at either the load or the display, which increases a risk to an accident.

FIG. 4 illustrates an example functionality of the controlling module in the crane for the "by-hand follower" functionality. Basically, when the operator presses a button or gives a joystick the command "by-hand follower", the switch 24 illustrated above in FIGS. 2B and 2C is set to use the first reference speed as the reference speed according to which the crane is moved as long as the button is pressed, or in an alternative implementation as long as the button is pressed again, or a corresponding command "not by-hand follower" is given by means of the button or the joystick, after which the switch is set to use the normal reference speed. Further, in an implementation, the "by-hand follower" may be active for a predetermined period of time, like 5 seconds, after the button has been released/pressed again, or "not by-hand follower" command is given. In addition, it is possible that the "by-hand follower" deactivates itself automatically after a predetermined period of time has lapsed from the time it was activated, unless it is deactivated earlier.

Referring to FIG. 4, the controlling module monitors, in step 401, whether or not the "by-hand follower" is activated by the operator. If an activation is detected, the switch is set, in step 402, in such a way that the first reference speed vref1, or a speed based on it, is fed to the control unit, and in step 403, the crane is moved according to the hook movement. In other words, the operator may drag or push the hook or the load in the hook, and the crane moves correspondingly, thanks to the inclinometer providing the angle feed-back information. If the operator does not move the hook (or the load), the crane does not move either. Further, it is monitored, in step 404, whether or not the "by-hand follower" is deactivated by the operator. If not, the process continues in step 403, in which the crane is moved according to the hook movement.

If the "by-hand follower" is deactivated in step 404, the switch is set, in step 405, in such a way that the normal reference speed $v_{ref0}$, or a speed based on it, is fed to the control unit, and in step 406, the crane is moved according to the instructions received from the operator's control device.

If the "by-hand follower" is not activated by the operator in step 401, the crane is moved, in step 406, according to the instructions received from the operator's control device (since the normal reference speed, or a speed based on it, is fed to the control unit).

It should be appreciated that depending on an implementation, the movement may be disabled for the trolley direction or for the bridge direction, or the movement is allowed in both directions.

In another example, the "by-hand follower" functionality uses the controlling module illustrated in FIG. 2E. The basic difference with the above-described example is that the command processing unit computes the modified control commands instead of the speed reference. Therefore, instead of setting the switch in step 402, the command processing unit starts to use the corrected angle information to form the modified control commands. The following table illustrates how values S1, S2 and AC, which the modified control command comprises, are formed. Limit values $\theta_{W1}$ and $°_{W2}$ are determined experimentally. When S1=0 and S2=0, the crane is stopping.

| Inputted angle information | Modified control command |
|---|---|
| $\theta_{cor} < -\theta_{W2}$ | S1 = 0; S2 = 1; AC = 1 |
| $-\theta_{W2} \leq \theta_{cor} < -\theta_{W1}$ | S1 = 0; S2 = 1; AC = ac |
| $-\theta_{W1} \leq \theta_{cor} < \theta_{W1}$ | S1 = 0; S2 = 0; AC = 0 |
| $\theta_{W1} \leq \theta_{cor} < \theta_{W2}$ | S1 = 1; S2 = 0; AC = ac |
| $\theta_{cor} \geq \theta_{W2}$ | S1 = 1; S2 = 0; AC = 1 |

If the "by-hand follower" is deactivated, instead of setting the switch in step 405, the command processing unit starts to use the estimated sway angle information to form the modified control commands, for example in a way described below with the description of FIG. 14, or simply forwards the speed reference received from the operator's controller $v_{ref0}$ to speed control 26-e, depending on the settings by the operator.

As is evident from the above, the "by-hand follower" control feature provides an easy-to-use, user-friendly way to control a crane, in which the crane follows the operator regardless of the direction in which the operator is walking, and on as "slalom-like" like manner as the operator walks. This is obtained by pressing one button, which activates the feature. Further, it provides accurate, fast and easy end-positioning, thereby increasing efficiency compared to the conventional control method, which allows movement control only by means of the operator's control device. A further advantage is that erroneous control information, like an operator confusing the directions or pressing a wrong button by accident, is avoided.

Side-Pulling Eliminator

The side-pulling eliminator is a control feature that aligns the trolley and/or the bridge essentially above the load before the load is lifted, i.e. the trolley and/or the bridge are moved such that the hook will be aligned above the load's centre of gravity. The control feature utilizes the fact that when the rope angle information θ indicates other than zero difference to the target angle, the controlling module, like the one illustrated in FIG. 2B or in FIG. 2E, will provide movement to a direction minimising the difference between the rope angle and the target angle until the rope angle is the same as the target angle. As stated above, the target angle is an angle with which the load is essentially below the trolley and/or bridge.

In the following, the saying "rope is vertical enough" means that the rope angle is does not deviate from the target angle more than a small value, for example, more than 0.05°. This value is in practice dependent on the angle sensor resolution and accuracy, and of the performance required from the functionalities.

In some cases, depending on the exact mounting of the sensor, the rope reeving and the maximum lifting height, it may be possible that the target angle is dependent on the rope length. In this case, the target angle may be measured when commissioning the crane or the upgrade of the crane, for example, by lifting the hook in vertical direction, without any swaying, from the maximum rope length to the minimum rope length, and the angle and rope length measurements or estimates may be stored. Such a measurement provides a correct target angle for the rope lengths used when performing any of the described functionalities.

FIG. 5 illustrates an example functionality based on the controlling module illustrated in FIG. 2B according to an embodiment providing three different side-pulling eliminating features, namely basic side-pulling eliminating (example illustrated in FIG. 6), a combination of automatic crane orientation and side-pulling eliminating (example illustrated in FIG. 7), and tandem side-pulling eliminating for a trolley (example with two trolleys illustrated in FIG. 8). It should be appreciated that in other embodiments only one or two of the three different eliminating features are implemented, and steps applying only to a non-implemented feature are then left out. Aligning the crane accurately above the load manually by the operator is time-consuming, and sometimes, when the operator is sitting in a crane cabin, it is even impossible to see if the load is accurately below the crane, especially in the tandem use. The side-pulling eliminator performs the aligning automatically.

Referring to FIG. 5, the controlling module monitors, in step 500, whether or not a side-pulling eliminator is activated. Depending on an implementation, the side-pulling eliminator may be activated by the operator, preferably just before lifting the load, and/or it may be activated by the controlling module without an operator input. The controlling module may activate the side-pulling eliminator without the operator input in response to sensing that tightness of a rope or ropes exceeds a predetermined threshold. The tightness of the ropes may be sensed by means of one or more force sensors, load cell sensors or strain gauges, or monitoring a hoisting motor current and detecting a rapid increase in the hoisting motor current, as is well known for one skilled in the art. The tightness of the ropes may also be detected by receiving the load weight measurement via an interface. If the load weight information is not available from the crane via an interface, the above mentioned sensors, especially the load cell sensor, may be easily installed on an existing crane in order to detect the tightness of the ropes. An advantage of this type of automatic activation is that it prevents misuse of cranes, such as using a bridge or gantry for towing something, like a broken forklift truck, which may create stress exceeding "the stress-capability" of crane structures. Another advantage is that lifting is not prevented if no load is detected, which ensures good usability of the crane in all circumstances, even if the ropes are misaligned due to the hook, for example, lying on a table prior to lifting it.

When the side-pulling eliminator is activated in step 500, the switch is set, in step 501, so that the first reference speed $v_{ref1}$, or a speed based on it, is fed to the control unit. Then it is checked, in step 502, whether or not automatic crane orientation is selected. For example, the operator may have pushed a button for the automatic crane orientation.

If the automatic crane orientation is selected (step 502), it is checked, in step 503, whether or not the rope angle is the same, or almost the same (see below), as the target angle. If the trolley and the bridge are already directly above the load, the load can be safely lifted. Therefore the side-pulling eliminator is deactivated and the switch is set, in step 510, in such a way that the normal reference speed $v_{ref0}$ or speed based on it is fed to the control unit, and in step 511, the crane is moved according to the instructions received from the operator's control device (since the normal reference speed is fed to the controlling module).

If the rope angle is not the same or almost the same as the target angle (step 503), lifting is deactivated in step 504. Then it is checked, in step 505, whether or not the eliminator is activated for tandem use. If it is activated for tandem use, in the illustrated example side-pulling eliminating for bridge direction is disabled in step 506. This takes into account the fact that the load may have lifting points that are differently aligned in the bridge direction and therefore it may be impossible to align the bridge correctly. It should be appreciated that side-pulling in the bridge-direction may still be detected, and the operator may be provided with an alarm (light or sound, for example) and/or if the side-pulling in the bridge-direction is determined to exceed a safety limit for that direction, the lifting may be prevented. This is not, however, illustrated with FIG. 5. If the side-pulling eliminator is not activated for tandem use, step 506 is skipped over. Then, in both cases, the crane is moved, in step 507, towards the direction that will minimize the difference between the rope angle and the target angle—without operator involvement. Meanwhile it is monitored, in step 508, whether or not the rope angle is the same as the target angle. The crane movement will stop when the angle difference is zero, or almost zero. If the rope angle differs from the target angle (step 508), the crane is moved in step 507. If the crane has stopped, or stops (step 508), the trolley is directly above the load (and in the case of "not tandem use" also the bridge), and the load can be safely lifted. Therefore lifting is activated in step 509, and the switch is set in step 510, in such a way that the normal reference speed $v_{ref0}$, or a speed based on it, is fed to the control unit, and in step 511, the crane is moved according to the instructions received from the operator's control device (since the normal reference speed, or a speed based on it, is fed to the control unit). Setting the switch in step 510 will deactivate the side-pulling eliminator. If the bridge direction was disabled in step 506, it will be enabled in step 509.

If automatic crane orientation is not selected (step 502), the process proceeds to step 510 to feed the normal reference speed $v_{ref0}$, or a speed based on it, to the control unit. It should be appreciated that in another embodiment, the operator may switch off the automatic crane orientation at any phase. In a further embodiment the automatic crane orientation is switched off in response to detecting that the load is in the air.

If the side-pulling eliminator is not activated (step 501), the crane is moved, in step 511, according to the instructions received from the operator's control device (since the normal reference speed, or a speed based on it, is fed to the control unit) until the side-pulling eliminator is activated.

When the controlling module illustrated in FIG. 2E is used, in step 501 the command processing unit starts to use the corrected angle information to form the modified control commands, as is described above with the description of FIG. 4. In step 507 the crane is moved according to the modified control commands described above with the description of FIG. 4. Further, in step 510, the command processing unit starts to use the estimated sway angle information to form the modified control commands, for example in a way described below with the description of FIG. 14, and in step 511 the crane is moved according to these modified control commands.

In another exemplary embodiment, in the tandem mode the bridge direction is not disabled but the bridge is moved to minimize the rope angle in the bridge direction.

It should be appreciated that the automatic crane orientation may be triggered in other ways, for example in response to a controlling module detecting that a load is lifted in such a way that part of the load is still supported by the ground.

FIG. 6 illustrates the basic side-pulling eliminating when the target angle is vertical. Referring to FIG. 6, in point a), a non-alignment is detected and the functionality is triggered, so that in point b) the trolley and the bridge are automatically moved to a direction decreasing the rope angle so that the trolley direction angle and the bridge direction angle are corrected to be vertical, as illustrated in point c), the load being ready to be lifted. The load is lifted in point d).

FIG. 7 illustrates the combination of automatic crane orientation and side-pulling eliminating, a functionality provided by the side-pulling eliminator feature and the fact that a load, lifted from one end, caused deviation from the vertical line (i.e. caused side-pulling) when lifted, the functionality facilitating an operator to lift loads with challenging shapes, like large steel plates. As can be seen from FIG. 7, side-pulling caused by the changes in load orientation is compensated at points a), b), and c) by moving the trolley and the bridge automatically in a direction decreasing the rope angle while lifting one end of the load, so that the trolley direction angle and the bridge direction angle are corrected to be the target angle. When the target angle is achieved and lifting is stopped, the load is directly under the trolley, as illustrated at point d), and the load is ready to be moved.

FIG. 8 illustrates the tandem side-pulling eliminating when two or more trolleys located on the same bridge are moved together. Other examples of tandem use include the following: moving together two or more cranes, moving together two or more cranes and at least one of the cranes comprising two or more trolleys that are located on the same bridge, and these trolleys are moved together and together with the trolleys of another crane. For example, there may be a crane system with two cranes, both having two trolleys and each trolley having at least one angle sensor. There may be a controlling module in each trolley, or in each crane, or the system may have a common controlling module receiving angle feedback information from the angle sensors.

In the tandem side-pulling eliminating, the basic side-pulling eliminating is performed in the trolley direction for each trolley separately, as is shown at point a). When both trolleys have corrected their trolley direction angle to be vertical, shown at point b), the load is ready to be lifted, and it is lifted as shown at point c) according to the operator instructions.

Although in FIGS. 6 to 8 only the trolley movement is illustrated, it should be appreciated that it is possible to move both the trolley and the bridge.

As is evident from the above illustrated examples, advantages provided by the side-pulling eliminator feature include simple crane positioning, since the crane is automatically positioned right above the load to be lifted, and it eliminates user-made hazardous side-pulling incidents. Lifting a load from a position causing side-pulling stresses the crane and initiates load swaying, which, in turn, are dangerous for the load and for people, other apparatuses and articles near the lifting point. All this is avoided by means of the side-pulling eliminator.

Side-Pulling Alerter

A side-pulling alerter is a feature providing a crane operator with an alert if the ropes are misaligned, i.e. the load is not essentially below the trolley. Although cranes are designed to tolerate a certain amount of side-pulling, the load must nevertheless be aligned quite accurately below the trolley when lifted to avoid causing unnecessary stress on the crane, which, in the worst case, will result in the crane breaking down. For example, a rope guide or the rope may be broken due to a stress caused by repetitive side-pulling or the rope can jump off the drum groove and get cut off. Side-pulling is also a safety hazard as the load may start to sway once lifted if it has not been properly aligned below the crane prior to lifting. Aligning the crane accurately above the load is time-consuming, and sometimes, when the operator sits in a crane cabin, it is even impossible to see if the load is accurately below the crane. The side-pulling alerter facilitates detecting whether or not the load is below the load vertically enough.

Figure 9:
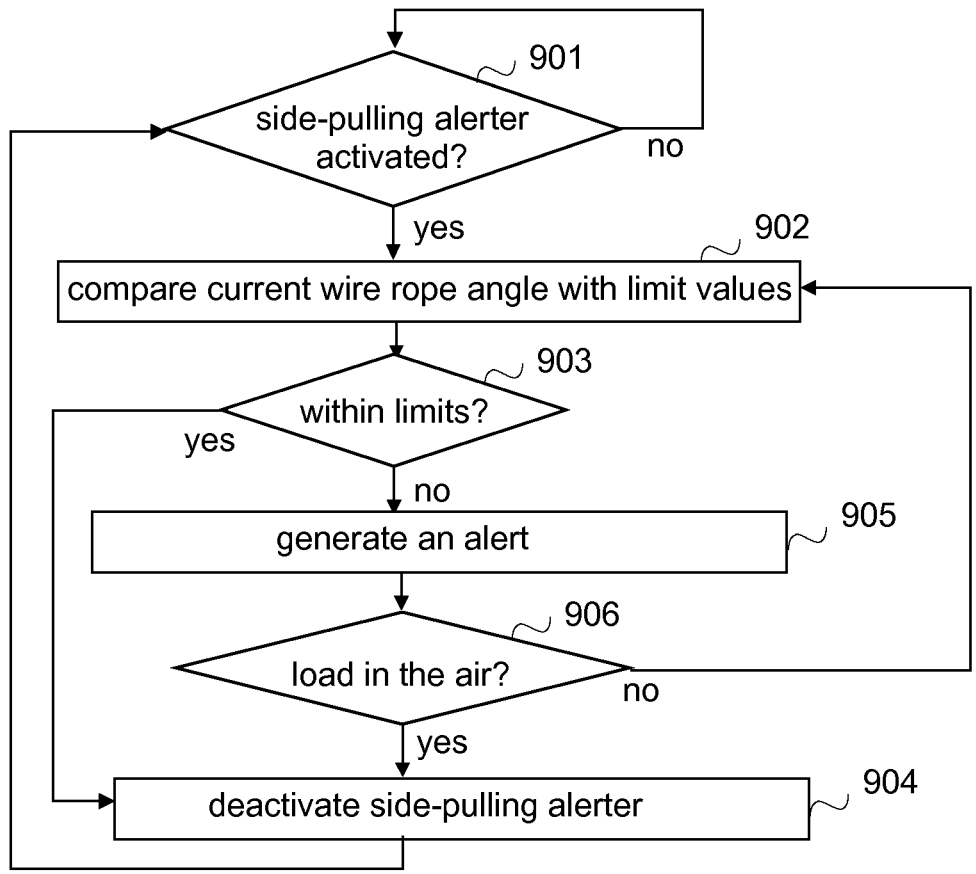

FIG. 9 illustrates an exemplary functionality of the controlling module when the side-pulling alerter, i.e. an alert, is activated. The side-pulling alerter may be activated by the operator by means of the operator's control device whenever the operator wants to know whether or not the load and the trolley are properly aligned. Typically this happens when the load has been attached to the hook (or to any other gripping means used for attaching load to the crane) and the operator has tightened the ropes prior to lifting. When the ropes are tightened, the inclinometer provides reliable information about the alignment of the load with respect to the crane's bridge and trolley. The controlling module may activate the side-pulling alerter without the operator input in response to sensing that tightness of a rope or ropes exceeds a predetermined threshold. An advantage of this automatic activation is that it facilitates detecting whether or not there is a risk of side-pulling.

Referring to FIG. 9, the controlling module monitors whether or not the side-pulling alerter is activated. When the side-pulling alerter is activated (step 901), measured and low-pass-filtered rope angles $\theta_{lpf}$ (originally received from the inclinometer) obtained for trolley and/or bridge directions are compared, in step 902, with limit values. Examples of limit values are given below in the example described with FIG. 11. The limit values are preferably preconfigured to the memory of the computing module, and the values are reconfigurable. The values preferably take into account the type of the crane and its specifications, which typically allow a specific side-pulling angle when the load is lifted. If the received angle values are within the limits (step 903), the alerter is deactivated (step 904), and then it is monitored whether or not the alerter is activated (step 901) again. Depending on an implementation, if the received angle values are within the limits, information that everything is ok may be transmitted to the operator's control device after step 903.

If a received angle value is not within the limits (step 903), an alert is generated in step 905. Depending on implementation and system parameters, the generated alert may be transmitted to the operator's control device (i.e. to the user interface 34 in FIG. 2A or in FIG. 2C), or the controller may itself serve as an alerting user interface. An alerting user interface may play a sound, put on light or lights at corresponding spots or points on the user interface, vibrate, display an alert message or a picture, etc., or any combination thereof. In other words, any alerting measure may be used. After that, it is checked, in step 906, whether or not the load has already been lifted to the air. If it has, the process proceeds to step 904 to deactivate the side-pulling alerter, since there is no point in continuing alarming "please correct placement before you lift" after the lifting has taken place. If the load is not yet lifted to the air (step 906), the process proceeds to step 902 to compare the angle difference. Thus, the alerter alerts as long as the load is not vertically enough below the trolley or the load has been lifted.

Side-Pulling Preventer

A side-pulling preventer will prevent the hoisting or the crane from travelling in directions increasing side-pulling when side-pulling occurs. Thereby, it also makes it easier to overcome problems caused by the side-pulling and discussed above with the side-pulling alerter.

Figure 10:
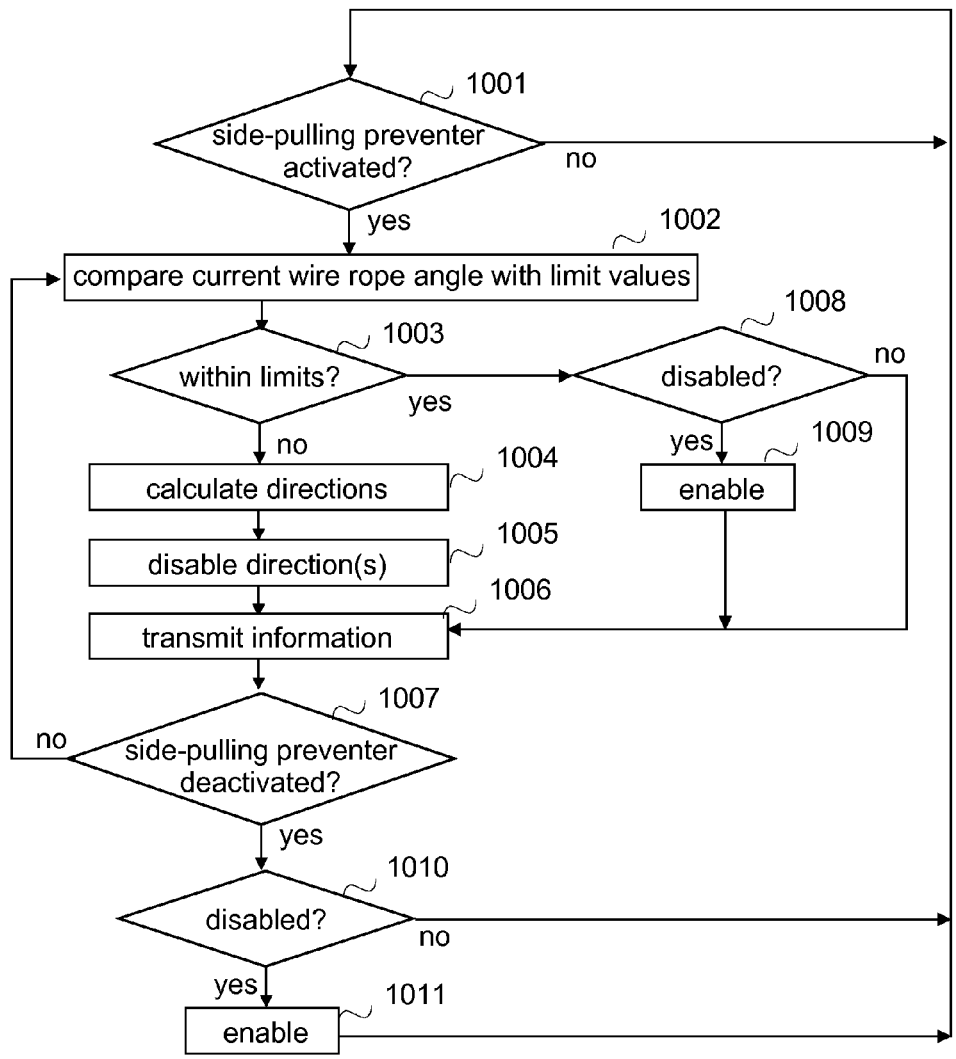

FIG. 10 illustrates an exemplary functionality of the controlling module, when the side-pulling preventer is activated (step 1001). The side-pulling preventer may be activated in the same way as the side-pulling alerter, i.e. by the operator and automatically, or only by the operator, or only automatically, as is described above with FIG. 9.

When the side-pulling preventer is activated (step 1001), measured and low-pass-filtered rope angles $\theta_{lpf}$ (originally received from the inclinometer) obtained for trolley and/or bridge directions are compared, in step 1002, with limit values. Examples of limit values are given below with the example described with FIG. 11. As with the side-pulling alerter, the limit values are preferably preconfigured to the memory of the computing module, and they are reconfigurable. The limit values for the alerter may be different from the limit values for the preventer, or the same values may be used for both functionalities.

If a received angle value is not within the limits (step 1003), the directions in which the crane can and cannot be driven are calculated in step 1004, and the one or more directions in which the crane cannot be driven are disabled in step 1005 for lifting and for the trolley and/or the bridge, and the other one or more directions in which the crane can be driven are enabled (or remain enabled if they have not been disabled earlier). Thus, in step 1005 the outcome of the calculation of point 1004 is implemented. The directions are calculated to decrease and not to increase the angle of the rope with respect to the target angle. The crane can be moved in directions that are not disabled, thereby allowing a decrease in the rope angle. The disabled directions are directions increasing the side-pulling. For example, in the situation illustrated in FIG. 6, point a), the disabled directions would be for the crane to move to the left and for the load to be lifted up. In the illustrated example, information on the disabled and enabled directions, i.e. prevented and allowable directions, is further transmitted, in step 1006, to the operator's control device (i.e. to the user interface 34 in FIG. 2A or in FIG. 2C). Then it is checked, in step 1007, whether or not the side-pulling preventer is deactivated. (The side-pulling preventer may be deactivated for the same reasons as the side-pulling alerter.) If not, the process continues to step 1002 to compare angle values with limits. If the side-pulling preventer is deactivated, it is checked, in step 1010, whether or not there are directions that are disabled. If there are, they are enabled, in step 1011, thereby allowing lifting and the trolley and the bridge to move in any direction. After that, or if there are no disabled directions (step 1010), the process continues to step 1001 to monitor whether or not the side-pulling preventer is activated.

If the received angle values are within the limits (step 1003), it is checked, in step 1008, whether or not there are directions that are disabled. If there are, they are enabled, in step 1009, thereby allowing lifting and the trolley and the bridge to move in any direction. Then the process continues to step 1006 to transmit information about the directions. It should be appreciated that if no information is displayed on a user interface, it may indicate that no direction is disabled and free moving is allowed.

To disable and enable crane operation in one or more directions, the controlling module (or the side-pulling preventer) may be connected in series with different limit switches. In other words, control of a specific direction is connected to a limit switch (a limit is activated), wherein the crane cannot move in the specific direction.

In one embodiment, the side-pulling preventer is active all the time, and no steps 1001 and 1008 to 1011 are performed but the process continues from step 1006 to step 1002.

In another implementation, steps 1008 and 1010 are left out, and all directions are enabled regardless of whether or not they were disabled when the side-pulling preventer is deactivated.

Side-Pulling Correction Assistant

The side-pulling correction assistant is a user interface implementation facilitating the operator to move the crane in proper directions. It is specifically usable with the side-pulling alerter and/or with the side-pulling preventer. In principle, the controlling module determines what is displayed on an interface of an alerting device, such as the operator's control device (i.e. on the user interface 34 in FIG. 2A or FIG. 2C), and then transmits appropriate signals to the alerting device, or if several alerting devices are in use for one crane (or for one trolley), to the alerting devices displaying the same information.

The alerting device may be connected via a fixed connection or wirelessly to the controlling module, and there are no restrictions for the location of the alerting device. For example, the alerting device may be mounted or integrated on the trolley, and/or on the hook, and/or on the user's control device, and/or in a crane cabin. An advantage of having the alerting device on the hook is that the operator does not have to move his/her eyes from the hook and/or load while it is being lifted, which reduces risks of collision and/or risks of accident. Further, if the alerting device is integrated with the hook, it can act as a rotational electromagnetic generator and thereby can harvest the energy it needs completely from the rotation of the rope pulleys. One example of such a generator is described in DE 102009036480, which is incorporated as a reference herein.

Figure 11:
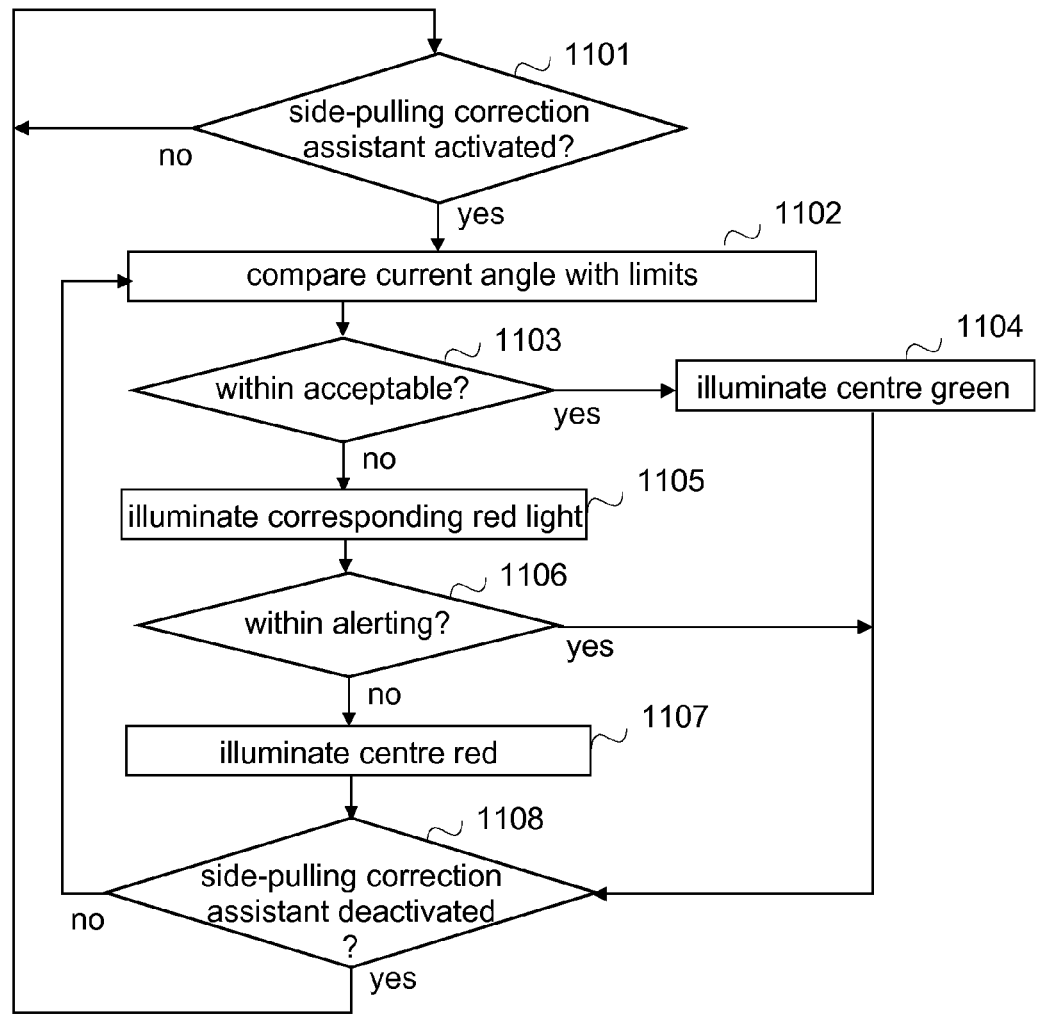

FIG. 11 illustrates the functionality of an alerting device in an exemplary embodiment in which the alerting device comprises five lights, for example LED lights, that may be illuminated, based on measured and filtered angle information and limits provided in the following table. It should be appreciated that the limits are only examples, and any other appropriate values may be used.

| Direction in which the angle is measured | Acceptable value range | Limits for alerting | Limits for prevention | Light activated |
| --- | --- | --- | --- | --- |
| bridge | −2° to 2° | −4° to −2° | <−4° | ▲ (L1) |
| bridge | −2° to 2° | 2° to 4° | >4° | ■ (L2) |
| trolley | −2° to 2° | −4° to −2° | <−4° | ▬ (L3) |
| trolley | −2° to 2° | 2° to 4° | >4° | ● (L4) |

The limits given in the above table may be used for the alerter (limits for alerting) and/or for the preventer (limits for prevention) in the above illustrated examples. It should be appreciated that the limit values may be preconfigured, and are preferably reconfigurable.

A functionality of an exemplary side-pulling correction assistant is described in detail with FIG. 11. The side-pulling correction assistant may be separately activated/deactivated, or it may be automatically activated/deactivated in response to the alerter and/or the preventer being activated/deactivated and/or to the detection of tightness of the ropes. When the side-pulling correction assistant is activated, it is assumed that the ropes are tight.

Referring to FIG. 11, when the side-pulling correction assistant is activated (step 1101), the corrected angle information, i.e. the current rope angle value at each time, is compared in step 1102 with the limit values disclosed in the above table. If the current rope angle is within the limits of acceptable value range (step 1103) of both the trolley and the bridge, a green light in the centre of the alerting device is illuminated in step 1104. It indicates that there is no unacceptable excessive side-pulling and that lifting is safe in that respect. Then the process continues to step 1108 to check whether or not the side-pulling correction assistant is deactivated.

If the current rope angle is not within at least one of the limits of acceptable value range (step 1103), a corresponding red light is illuminated in step 1105. Further, it is checked, in step 1106, for each angle "not within the acceptable value range", whether the current rope angle is within limits for the alerting. If they all are, the process continues to step 1108 to check whether or not the side-pulling correction assistant is deactivated. The illuminated red light(s) indicate(s) to the operator that side-pulling is present and the crane should not be driven towards the direction indicated by the illuminated red light(s). It should be appreciated that in another embodiment all the other lights are illuminated by green indicating recommended movement direction(s).

If at least one of the current rope angle value is not within the limits for the alerting (step 1106), the current rope angle is within the limits for prevention, and the centre light is illuminated, in step 1107, by red colour (and depending on an implementation, one or more limit switches may be activated to prohibit movement in a direction which would increase the side-pulling). Then the process continues to step 1108 to check whether or not the side-pulling correction assistant is deactivated. Having the centre light in red indicates to the user that there is unacceptable excessive side-pulling and no lifting can or should take place and the crane should be driven towards the direction indicated by the illuminated non-centre red light.

Thus, if there is no misalignment of the rope, the centre light is illuminated by green and indicates that it is possible to lift the load safely without unacceptable excessive side-pulling. In any other case, the other four lights are used to assist the operator to detect that side-pulling exists in one or more directions, and to instruct the operator to control the crane in the direction(s). If the centre light is red, it indicates to the operator that lifting/hoisting is not possible, it is disabled by the controlling module, and the operator may only drive the crane in the directions that will straighten the ropes (the direction being indicated by the four lights).

In the above example, the misalignment of the bridge direction was shown by shapes associated in the above table with L1 and L2, and the misalignment of the trolley direction by shapes associated in the above table with L3 and L4. It should be appreciated that other ways to show the alignment information may be used. For example, the misalignment of the rope in the trolley and the bridge directions may be shown by means of a circle shape (current angle) and cross shape (target angle) in a display. If the circle and the cross overlap, the misalignment is within the acceptable value range.

It should be appreciated that other colours than red and green may be used, and/or there may be different symbols instead of different colours, or different sounds or vibrations, or any combination thereof, may be used for the same purposes.

An advantage provided by the assistant is that it facilitates the operator's work and helps to avoid safety risks. Further the operator, by knowing the proper alignment direction, saves time and can work more efficiently, and can also more easily control the crane remotely, even without a camera-based monitoring system, for example.

Collision and Load Entanglement Detector

A collision and load entanglement detector is a feature that minimizes the damages caused by unwanted incidents, such as collisions or entanglements of the hook, grabber or load.

Figure 12:
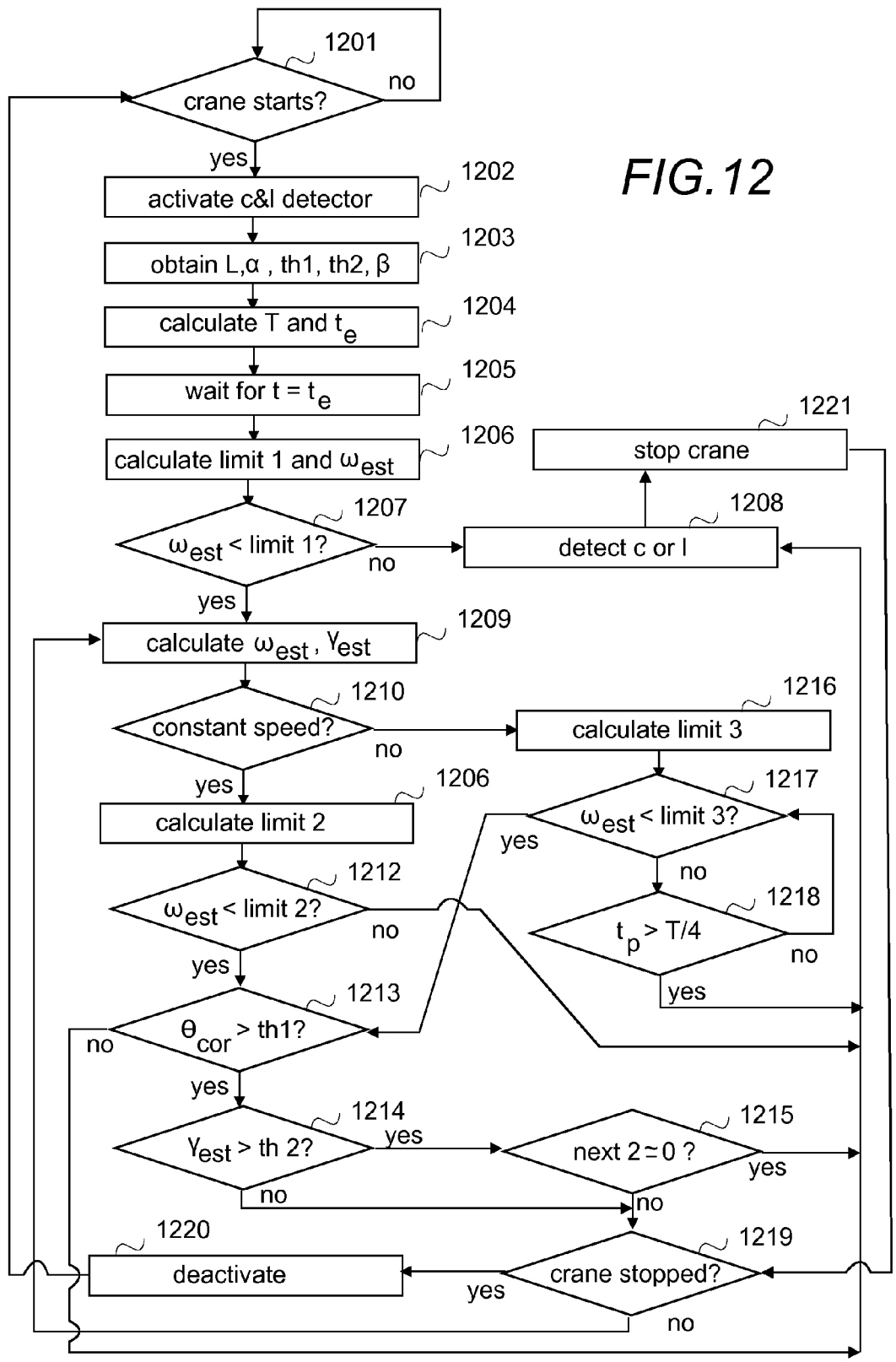

In the illustrated example of FIG. 12, it is assumed that the moving of the load begins with tightening the ropes and then moving the bridge and/or trolley, and that one condition is monitored during the start-up phase and four conditions after the start-up phase has elapsed. In other implementations, only one, two, three or four of the monitored conditions may be used. It should be appreciated that the below-described calculations and comparisons are made separately for the trolley movement direction and for the bridge movement directions, and that variable values are calculated and monitoring performed all the time in the background.

Referring to FIG. 12, when it is detected that the crane starts moving (step 1201), the collision and load (c&l) entanglement detector is activated in step 1202. Then the rope length L, a coefficient $\alpha$, two thresholds (th1 and th2), and a constant $\beta$ are obtained in step 1203. The rope length may be measured or obtained from a memory storing rope lengths, or instead of the rope length, a length value that corresponds to a situation where the load would be on the floor level all the time may be used, or the length value used may be a typical length of the rope when the crane is moving. The coefficient $\alpha$, the threshold and the constant $\beta$ are obtained from a memory, where their values are preset. The coefficient $\alpha$ may be greater than zero up to and including one (i.e. $0<\alpha\leq1$). The value of the coefficient $\alpha$ is determined experimentally, and it depends on the acceleration time of the crane and a period of oscillation. If the acceleration from zero to a constant speed v (i.e. the speed used for driving the crane/trolley/bridge) lasts more than a quarter of the period of oscillation, a coefficient value smaller than one enables faster detection of a collision. The threshold th1 is a maximum acceptable value for the corrected angle under any circumstances, and is also determined experimentally. The threshold th1 may be 5°, for example. The threshold th2 is for detecting peaks (sudden high values, impulse-like changes) from the angular acceleration. The constant $\beta$ may be determined experimentally, and it is preferably greater than zero up to and including one (i.e. $0<\beta\leq1$).

After that a period of oscillation T and an end time $t_e$ of start-up phase are calculated, in step 1204, by using the following formula (3) for the period of oscillation and the following formula (4) for the end time $t_e$:

$$T = 2\pi\sqrt{L/g} \tag{3}$$

$$t_e = \frac{\beta T}{4} \tag{4}$$

wherein

T=period of oscillation $t_e$=end time of start-up phase $\beta$=constant whose value is obtained in step 1203, L=used rope length, and g=gravitational acceleration Then one waits, in step 1205, for the time t that has elapsed after the crane started to move to be the end time of the start-up phase. At that time, a limit 1 value and an absolute value of an estimated sway angular speed $\omega_{est}(k)$ are calculated in step 1206. The limit 1 value may be calculated by using the following Formula (5):

$$\text{limit } 1 = \left|\frac{v(t)}{L}\right| \tag{5}$$

wherein t=time that has elapsed since the crane started to move v=trolley's or bridge's speed, received from a sensor monitoring the speed, for example from a frequency converter in the crane, and L=rope length used The absolute value of an estimated sway angular speed $\omega_{est}(k)$ may be calculated by using the observer in FIGS. 2D and 2E or by the following Formula (6):

$$\omega_{est} = \left| \frac{\theta_{est}(k) - \theta_{est}(k-1)}{h} \right| \quad (6)$$

wherein
$\omega_{est}$=absolute value of estimated sway angular speed for sample number k
k=sample number (sample identifier) at time t
$\theta_{est}(k)$=estimated angle value of sample number k that is based on the corrected angle information, as is described above with the description of FIG. 2D, for example
h=sample time between samples number k−1 and k Then it is checked, in step 1207, whether or not the absolute value of the estimated sway angular speed is smaller than the limit 1. If it is not, load entanglement or collision is detected in step 1208, in the illustrated example the crane is stopped in step 1221, and when the crane has stopped (step 1219), the collision and load entanglement detector is deactivated in step 1220. However, depending on an implementation, the load entanglement or collision detection may trigger an alert and/or cause automatic stopping of the crane to prevent further damage. When the crane stops, the collision and load entanglement is deactivated, but if an alert is triggered, the collision and load entanglement may remain active.

If the absolute value of the estimated sway angular speed is smaller than the limit 1, the process continues to step 1209 to calculate the absolute value of the estimated sway angular speed $\omega_{est}(k)$ using the Formula (6), and an absolute value of an angular acceleration $\gamma_{est}$ using the following Formula (7):

$$\gamma_{est} = \left| \frac{\omega_{est}(k) - \omega_{est}(k-1)}{h} \right| \quad (7)$$

wherein
$\gamma_{est}$=absolute value of estimated angular acceleration for sample number k
k=sample number (sample identifier)
$\omega_{est}(k)$=the estimated sway angular speed for sample number k, calculated using Formula (6)
h=sample time between samples number k−1 and k Then it is determined, in step 1210, whether or not the crane is moving at a constant speed. If the speed is constant, a limit 2 is calculated, in step 1211, by using the following Formula (8):

$$\text{limit } 2 = \alpha \left| \frac{v}{L} \right| \quad (8)$$

wherein
α=coefficient, the value of which is obtained in step 1203
v=crane's speed (i.e. the speed of the trolley or the bridge), received from a sensor monitoring the speed, for example from a frequency converter in the crane, and
L=rope length used Then the absolute value of the estimated sway angular speed is compared, in step 1212, with the limit 2. If the estimated sway angular speed is not smaller than the limit 2, load entanglement or collision is detected in step 1208.

If the estimated sway angular speed is smaller than the limit 2, the corrected rope angle information $\theta_{cor}$ is compared with the threshold th1 in step 1213. If the threshold th1 is exceeded, load entanglement or collision is detected in step 1208, and in the illustrated example the process proceeds to step 1221 to stop the crane.

Otherwise the process proceeds to step 1214 to check whether or not the absolute value of the estimated angular acceleration exceeds the threshold th2. If the threshold th2 is exceeded, it is monitored, in step 1215, whether the next two absolute values of the estimated angular acceleration are about zero. If they are, load entanglement or collision is detected in step 1208. Thus, in the example a predetermined rule for the estimated angular acceleration is defined by steps 1214 and 1215.

If the crane is not moving at a constant speed (step 1210), a limit 3 is calculated, in step 1216 by using the following Formula (9):

$$\text{limit } 3 = \alpha \left| \frac{v(t)}{L} \right| \quad (9)$$

wherein
α=coefficient, the value of which is obtained in step 1203α
v(t)=crane's speed (i.e. the speed of the trolley or the bridge), at time t received from a sensor monitoring the speed, for example from a frequency converter in the crane, and
L=rope length used Then the absolute value of the estimated sway angular speed is compared, in step 1217, with the limit 3. If the estimated sway angular speed is not smaller than the limit 3, it is monitored (step 1218) whether or not the estimated sway angular speed remains greater than or equal to the limit 3 for a time period $t_p$ of more than a quarter of the period of oscillation T. If it does, the load entanglement or collision is detected in step 1208. Otherwise the process proceeds to step 1213 to compare the corrected rope angle information $\theta_{cor}$ with the threshold th1.

If the estimated sway angular speed is smaller than the limit 3 (step 1217), the process proceeds to step 1213 to compare the corrected rope angle information $\theta_{cor}$ with the threshold th1.

The steps 1209-1218 are repeated until the crane has stopped (step 1219) and the collision and load entanglement detector is deactivated in step 1220, and the process continues to step 1201 to monitor whether or not the crane is started again.

In another implementation, instead of the corrected rope angle information $\theta_{cor}$, the estimated sway angle $\theta_{est}$ is used with a corresponding threshold value in step 1213.

By detecting collisions and entanglements as soon as possible by the above-described means further damages to the crane's operating environment and to the crane are prevented. The advantages are obtained even if a fixed rope length value is used instead of a measured rope length: the reaction time may be longer but the crane will eventually stop because of step 1208. The collision and load entanglement detector also prevents or minimizes damages in case of unexpected movements (such as those caused by jammed control buttons or electrical faults). It is especially helpful in fully and semi-automatic crane applications because it ensures that the crane will stop if the load is not following the movement of the crane accurately enough. Without the above-described feature in the fully or semi-automatic crane applications, a crane may keep on moving, or at least try to keep on moving, even though a collision or some entanglement has happened, thereby increasing the damages.

3D Positioner of the Hook

An accurate positioning of the hook with respect to the trolley and the bridge is possible by means of the estimated rope angle obtained from the rope angle information from the inclinometer, when the rope length is known. However, an estimated rope length may be used instead. The estimated rope length may be a typical height used for lifting loads, such as an average height level of the hook and the load compared to the ground level above which the load is lifted. In yet another example, the rope length may be estimated to be one meter less than the trolley height. Further, the estimated rope length value may depend on the dimensions of the load to be lifted. The exemplary embodiment illustrated in FIG. 13 utilizes the fact that the estimated rope length provides an accurate enough value for further controlling measures of the crane. It should be appreciated that if accurate rope length information is available, it is preferably used instead of the estimated rope length.

Figure 13:
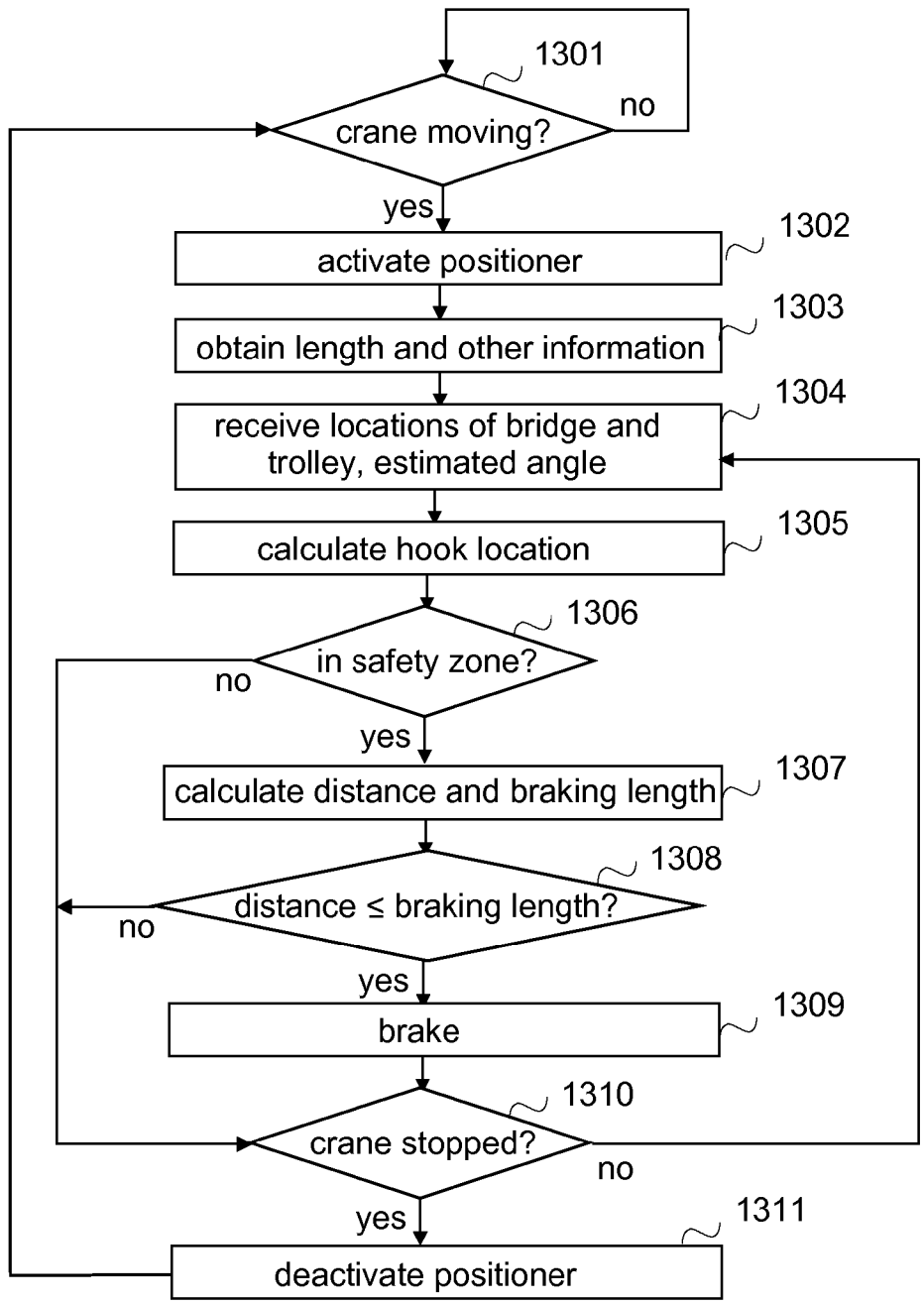

Referring to FIG. 13, when it is detected that the crane has started moving (step 1301), the 3D positioner is activated in step 1302, and the estimated length of the rope and other relevant information are obtained in step 1303. The other relevant information depends on implementation and/or the purpose for which the 3D positioner is activated. Examples of other relevant information include information on protected areas, information on safety zones and swaying detection definitions. A protected area means here an area which the hook or the load is not allowed to enter. The safety zone determines an area where the hook is near or in the protected area. The protected areas may be defined as 2D areas having an indefinite height, or as a 3D area having a specific height. Therefore one cannot drive across a 2D area, but over the 3D area it is possible if the load height from the ground is greater than the specific height. For example, if there is a horizontal beam as a projecting part, nothing under the beam or to the height of the beam can be moved in the 3D area. In the 2D area nothing can be driven above the beam either. It should be appreciated that the 3D positioner may be activated separately, for example in response to the load or the hook entering a safety zone defined for a protected area, and deactivated in response to the load or the hook leaving the safety zone, and/or in response to a specific instruction received from the operator.

In the illustrated example the controlling module is connected to, in addition to the inclinometer, sensors or other means that measure the location of the bridge and the location of the trolley. Therefore, in step 1304, the locations of the bridge and the trolley, and the estimated rope angle (processed angle information from the inclinometer) are received, and the three-dimensional location of the hook is calculated, in step 1305, by using the information received in step 1304 and the estimated rope length, the location of the hook being determined regarding the trolley and the bridge in this example, since in the illustrated example, the safety zones are defined regarding the coordinates of the trolley and the bridge, and possibly regarding the estimated rope length.

Then, in the illustrated example, it is checked in step 1306 whether the hook is near a protected area/volume. In the illustrated example, a safety zone defining "the near area" is defined around the protected area/volume. If the hook is in the safety zone, it is approaching the protected area/volume, and therefore a distance of the hook to the protected area and a braking length (also called deceleration distance) the crane needs for stopping, are calculated in step 1307. The distance and the braking length may be calculated using the crane's speed (in the trolley direction and in the bridge direction), deceleration parameter, estimated rope angle value, estimated sway angular speed, position of the crane, and the definitions of the protected area/volume. Then the distance is compared, in step 1308, with the braking length. If the distance is equal to or smaller than the braking length, braking the crane is started, or if already started, continued in step 1309. In other words, the crane is decelerated in step 1309.

Then it is checked if the crane has stopped in step 1310. If it has, the 3D positioner is deactivated in step 1311, and the process continues to monitoring (step 1301) whether or not the crane starts to move.

If the crane is moving (step 1310), the process returns to step 1304 to receive current locations and angle information.

If the hook is not in the safety zone (step 1306), the process continues to step 1310 to check if the crane is stopped. The crane may be stopped in response to the operator pushing a stop button, for example.

In another embodiment, a swaying detector is implemented, the swaying detector determining whether or not the hook is swaying. For example, the swaying detector may be used in response to the hook being in the safety zone (step 1306) and/or in response to the braking length being smaller than the distance (step 1308). The easiest way to determine whether or not the hook is swaying is to determine a sway amplitude by means of a minimum estimated angle value and a maximum estimated angle value amongst estimated angle values determined during the last five seconds, for example. If the amplitude of swaying is significant, the swaying may be taken into account when the breaking distance is calculated, since it may take more space to stop a swaying load than a load that is not swaying.

An accurate enough three-dimensional location of the hook enables introducing many useful features, like the above-described swaying detection and protected areas without a complicated controlling and measuring logic. The 3D location thus obtained provides additional information about external forces affecting the load sway, for example forces caused by wind, swaying due to misaligned lifting (side-pulling) and collisions. The unforeseen swaying will not cause safety hazards with respect to the protected areas as the swaying is observed by the inclinometer. By means of the embodiment, the concept of protected area can be made safer, because the true location of the hook is known in all circumstances. If load sway occurs due to any reason, it is detected and the crane can be stopped early enough to prevent the swaying hook to enter a protected area.

Anti-Sway Control

Anti-sway control is a control feature targeted to damp swaying. Damped swaying is a safety issue and provides more accurate load handling facilitating exact and fast positioning of the load. There always exists a sway of the load due to crane movement and disturbances, like wind, and thus anti-sway control is needed. Compared to an open loop anti-sway control, the closed loop anti-sway control provided by the arrangement illustrated in FIG. 2D and FIG. 2E, for example, takes into account rope angle deviations caused by external disturbance forces, like an impact of wind, initial swaying after side-pulling and lifting, and a collision. Especially with harbour cranes, wind is a rather great problem, because the side-area of the load is rather large, and in harbours it is almost always windy.

Figure 14:
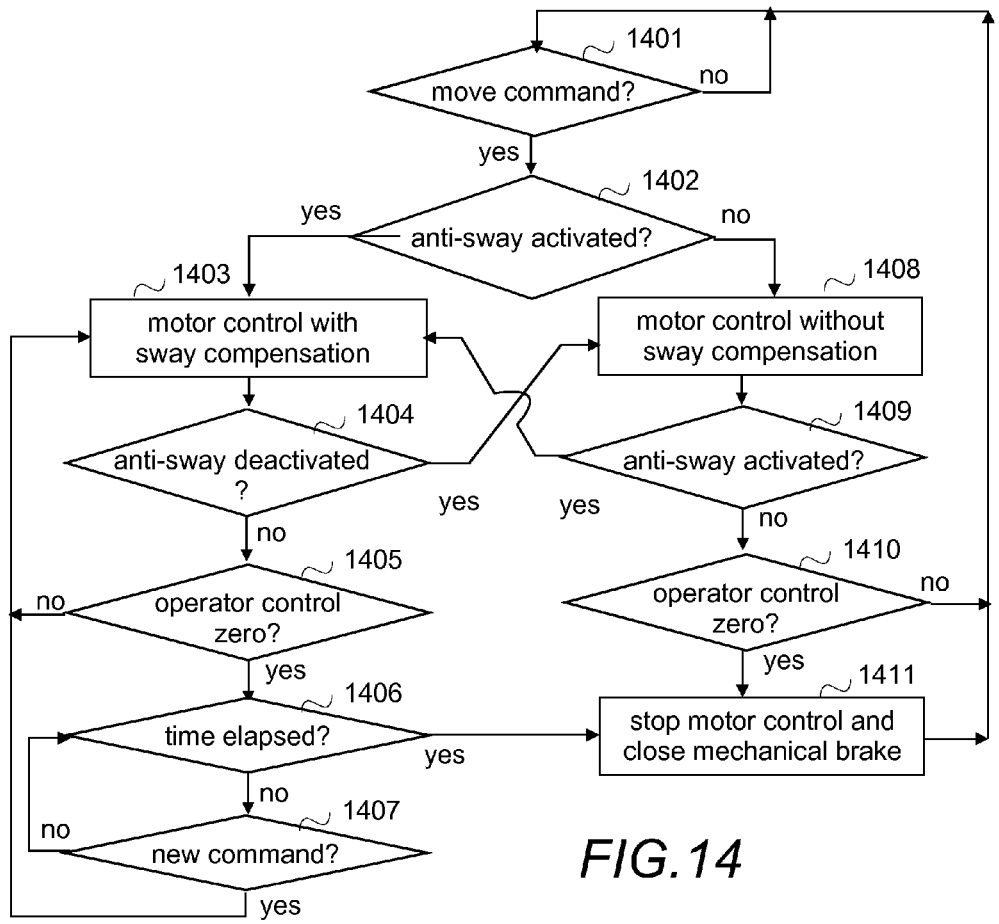

FIG. 14 is a flow chart illustrating a difference between anti-sway control being in use and not in use in a motor and brake control of the crane.

Referring to FIG. 14, when the operator starts to drive the crane, i.e. it is detected that the operator gives a move command to the trolley and/or to the bridge (step 1401), it is checked, in step 1402, whether or not the operator has activated the anti-sway control. There are several ways to detect this. For example, if the gain value in the P-controller (module 32 in FIG. 2D) is set to zero, this means that the anti-sway control is not in use, and if it is set to another value, the anti-sway control is in use. Another example includes that, since the selection of anti-sway functionality is done by the operator from the radio controller, the radio may transmit the status information to the controlling module, where the information is processed by the command processing unit (module 35 in FIG. 2E). If the anti-sway control is in use (step 1402), the motor is controlled, in step 1403 with sway compensation. Sway compensation may be obtained by means of a rate-limited speed reference corrector ($v_{ref,cor}$ in FIG. 2D), which depends, in addition to the gain, on an estimated sway angle $\theta_{est}$ calculated by the observer by using Formulas (1) and (2) from the rope angle information, as described above with the description of FIG. 2D. Another way to obtain the sway compensation is to use the command processing unit in FIG. 2E, in such a way that it uses the estimated sway angle $\theta_{est}$ as input to form the modified control commands. The modified control commands comprise values for S1, S2 and AC, the values being given in the following table. Limit values $\theta_{W1}$, $\theta_{W2}$ and $\omega_L$ are determined experimentally, and the first two limit values are preferably, but not necessarily, the same as the ones used when the corrected angle information is used, described above with the by-hand follower functionality. Further, one or more of the limit values may be a variable. For example, during stopping, i.e. when S1=0, S2=0, the limit values $\theta_{W1}$, $\theta_{W2}$ can be smoothly decreased as a function of time in order to minimize the sway after stopping. An angular speed $\omega_{est}$ is a time derivate of the estimated sway angle $\theta_{est}$. In other words, it may be obtained using Formula (2) with k2 value set to zero. As can be seen from the table, the estimated sway angle information is used as input in the anti-sway functionality.

| Inputted Angle Information | Angular speed | Modified control command |
| --- | --- | --- |
| $\theta_{est} < -\theta_{W2}$ | $\omega_{est} < \omega_L$ | S1 = 0; S2 = 1; AC = 1 |
| | $\omega_{est} \geq \omega_L$ | S1 = s1; S2 = s2; AC = ac |
| $-\theta_{W2} \leq \theta_{est} < -\theta_{W1}$ | $\omega_{est} < -\omega_L$ | S1 = 0; S2 = 1; AC = 1 |
| | $\omega_{est} \geq -\omega_L$ | S1 = s1; S2 = s2; AC = 0 |
| $-\theta_{W1} \leq \theta_{est} < \theta_{W1}$ | | S1 = s1; S2 = s2; AC = ac |
| $\theta_{W1} \leq \theta_{est} < \theta_{W2}$ | $\omega_{est} < \omega_L$ | S1 = s1; S2 = s2; AC = 0 |
| | $\omega_{est} \geq \omega_L$ | S1 = 1; S2 = 0; AC = 1 |
| $\theta_{est} \geq \theta_{W2}$ | $\omega_{est} \geq -\omega_L$ | S1 = 1; S2 = 0; AC = 1 |
| | $\omega_{est} < -\omega_L$ | S1 = s1; S2 = s2; AC = ac |

While the motor control with the sway compensation (step 1403) is performed, it is monitored whether or not the operator deactivates the anti-sway control (step 1404), and whether or not the reference speed from the operator has reached zero (step 1405). The reference speed from the operator means with the description of FIG. 14 and when the arrangement of FIG. 2D is used, the output of the rate-limiter 33' in FIG. 2D.

If the reference speed from the operator has reached zero (step 1405), one waits for a predetermined time while monitoring whether or not the operator provides a new reference speed, i.e. a new control command. In other words, it is checked, in step 1406, whether or not the predetermined time has elapsed. If not, it is checked, in step 1407, whether or not the new control command is received. If the new control command is received, the process continues in step 1403 by controlling the motor with the sway compensation. If no new control command is received (step 1407), the process returns to step 1406 to check, whether or not the predetermined time has elapsed. When the predetermined time has elapsed (step 1406) without reception of any control command, the motor control is stopped and the mechanical brake closed in step 1411. Then the crane is stopped. The predefined time may be set freely. For example, it may be 5 seconds. The brake-closing delay caused by waiting for the predefined time is for damping the sway during stopping. After the crane has stopped, a sway cannot be damped because anti-sway control, and thereby dampening the sway, is based on moving the crane. Then it is again monitored, in step 1401, whether or not the operator gives a moving command.

If the anti-sway control is not activated (step 1402), or is deactivated while the crane is moving (step 1404), the motor is controlled without sway compensation, i.e. by using the reference speed from the operator without correcting it (In the arrangement of FIG. 2D, the anti-sway controller is turned off by setting the gain of the P-controller to zero, and hence the reference speed corrector will be zero.)

While the motor control without the sway compensation (step 1408) is performed, it is monitored whether or not the operator activates the anti-sway control (step 1409), and whether or not the reference speed from the operator has reached zero (step 1410).

If the reference speed from the operator has reached zero (step 1410), the motor control is stopped and the mechanical brake closed in step 1411 without any waiting time. Then it is again monitored, in step 1401, whether or not the operator gives a moving command.

If the anti-sway control is activated (step 1409), the process proceeds to step 1403 to control the motor with the sway compensation. Since the observer calculates the estimated sway angle also when the anti-sway control is not in use, although the estimated sway angle is ignored (since the gain value in the P-controller is zero in the arrangement of FIG. 2D and the estimated sway angle is not used for control in the arrangement of FIG. 2E), the anti-sway control has immediately proper values in use when it is activated while the crane is moving. In some other embodiments, in which the observer is configured to calculate the sway angle estimate only when the anti-sway control is in use, one may wait for a predetermined time after the activation before the anti-sway control is taken into use, the predetermined time being used by the observer to calculate a proper sway angle estimate. The predetermined time may be freely selected. It may be 0.5 seconds or 1 second, for example.

In another embodiment, the anti-sway cannot be deactivated while the crane is moving. In the embodiment, step 1404 is skipped over. In a further embodiment, the anti-sway cannot be activated while the crane is moving. In the embodiment, step 1409 is skipped over. In a still further embodiment, the anti-sway cannot be deactivated or activated while the crane is moving. In the embodiment, steps 1404 and 1409 are skipped over. In further embodiments, activating/deactivating the sway control after the operator control has reached zero is also possible.

Another example illustrating a difference between anti-sway control implemented by means of the arrangement described in FIG. 2D or FIG. 2E being in use or not being in use is illustrated in FIGS. 15A and 15B. FIG. 15A shows experimental results of a sway angle of a trolley travelling when the anti-sway control gain b=4 m/s, the estimated rope length is 4 m, and the actual rope length is 3.5 m. The nominal speed of the trolley is 20 m/min. The other observer parameters are k1=0, k2=4 s$^{-1}$, and the acceleration compensation gain c=0.1 s²/m. FIG. 15B shows the result of the same crane when the anti-sway is not used. As can be seen, the load sway is effectively dampened with the anti-sway. In both figures, the filtered sway angle is denoted by a continuous line and the estimated sway angle is denoted by a dashed line.

In the above-described anti-sway control, an estimated rope length value is used. FIG. 15C shows a simulation result comparing the actual sway angle when the actual rope length value is 1 m with a corresponding estimated sway angle obtained by using the computing module illustrated in FIG. 2D and an estimated rope length of 10 m. The actual sway angle is denoted in the FIG. 15C with a continuous line and the estimated sway angle is denoted by a dashed line. Although there are some differences, they are very small. The fact supports the idea that there is no need to know the exact rope length; even if the estimated rope length is erroneous, the sway is efficiently dampened. The same apply also to the computing module illustrated in FIG. 2E.

A similar method with similar modules may be used with a voltage/frequency-controlled (U/f-controlled) travelling crane. However, with the U/f-controlled crane it is the frequency reference that is used instead of a reference speed.

An Exemplary Crane

FIG. 16 is a flow chart illustrating an exemplary crane having some of the above features implemented.

Referring to FIG. 16, it is detected, in step 1600, that a movement-related button in a crane-controlling device is pressed. It is checked, in step 1601, whether the movement related button was for "by-hand follower". If it was, it is checked, in step 1602, whether there is too heavy a load. In other words, it is checked whether or not the tightness of the ropes is below a threshold described above for example with the description of FIG. 5. If there is not too heavy a load (step 1602) the "by-hand follower" is activated, in step 1603, and kept activated as long as the button is pressed (step 1604). While the button is pressed, the crane is moved, in step 1605, according to the hook movement. When the button is released (step 1604), the "by-hand follower" is deactivated in step 1606, and the process continues to step 1600 to monitor whether a button is pressed. If there was too heavy a load the "by-hand follower" button is ignored, in step 1616, in the example, for safety reasons, and the process continues to step 1600 to monitor whether a button is pressed.

If the movement related button was not for "by-hand follower", it is an actual movement button, and it is checked, in step 1607, whether there is a heavy enough load attached to the hook. This may be checked by checking whether the tightness of the ropes exceeds the threshold, as described above with the description of FIG. 5. If there is a heavy enough load, the side-pulling eliminator is activated in step 1608. The side-pulling eliminator places, in step 1609, the trolley and the bridge, or if tandem operation is in use, at least the trolleys, in such a way that the load is essentially below them, ignoring the operator's movement instructions. When the load is in the ready-to-be-lifted position, the side-pulling eliminator is deactivated in step 1610, and the anti-sway control, 3D-hook positioning and the collision and load entanglement detector are activated in step 1611. In the illustrated example it is assumed, for the sake of clarity, that the load is safely transferred, in step 1612, to its new target position, the movement being monitored by the activated features. When the load is in its new target position and released from the hook, in step 1613, the tightness of the ropes decreases, and the anti-sway control, 3D-hook positioning and the collision and load entanglement detector are deactivated in step 1614. Then the process continues to step 1600 to monitor whether a button is pressed.

If there is no load (step 1607) or the load is light enough so that its side-pulling, for example, cannot cause damages to the crane, the crane is moved, in step 1615, as long as the button remains pressed. Then the process continues to step 1600 to monitor whether a button is pressed.

It should be appreciated that in some other embodiments one or more of the features activated in step 1611 may be active whenever the crane is moving.

Although not illustrated in FIG. 16, it should be appreciated that there are also other types of buttons, like a button for a buzzer signal. If such a button is selected, a corresponding action is performed.

Arrangement for Measuring Rope Length

FIGS. 17A and 17B illustrate an arrangement with which it is rather simply to estimate the rope length, the rope length being usable for all purposes where such information is needed, for example in some of the above-described examples. The arrangement may be installed to existing cranes during upgrading of the crane. One of the benefits of this arrangement is that the installation of the sensor may be easily and quickly done in existing cranes.

FIG. 17A is a block diagram of a part of a trolley. The arrangement 1700 comprises near a drum 104 an additional control pole 1710 over which the rope 140 is guided by means of a guiding member 1730 when the rope 140 is rolled up to or down from the drum 104. Further, on the bottom part of the trolley 120, a measuring member 1720, like a draw-wire sensor, is mounted.

FIG. 17B is a block diagram showing the cross section B-B of the arrangement 1700. From FIG. 17B one can see, that the guiding member 1730 is connected by a wire 1740, like a fishing line, to the measuring member 1720. The measuring member is configured to try to reel in the wire 1740 and to measure the length reeled in or out. The guiding member 1730 moves according to the rope 140 being rolled up or down, in such a way that when all the rope that fits to the drum is on the drum, the guiding member 1730 is in the other end of the drum than where the measuring member 1720, and when the rope 140 is rolled down from the drum 104, the guiding member 1730 moves towards the measuring member 1720. The movement enables the wire 1740 to be reeled in to or out from the measuring member.

Since the rope is rolled up, thanks to the guiding member 1730, to the drum so that adjacent rope portions are tightly to each other, the measuring member may calculate, by using the length the wire 1740 is reeled in or out, the length the rope is rolled down, and hence the length required in the calculations. In other words, the length the wire 1740 is reeled in or out defines where the guiding member 1730 is located, and this, in turn, defines how many circles of the rope is rolled down. Since each circle has the same length, the information is sufficient for determining the length. One example of an arrangement 1700 could be based on the utilization of a draw-wire sensor. Other methods of length measurement may also be utilized.

The steps/points, and related functions described above in FIGS. 4, 5, and 9 to 14, and 16 are in no absolute chronological order, and some of the steps may be performed simultaneously or in an order differing from the given one. Some of the steps or part of the steps may also be left out or replaced by a corresponding step or part of the step. Other functions may also be executed between the steps or within the steps. For example, the rope length (i.e. height) may be measured instead of using an estimate.

Although, in the above, the features are described as separate features, two or more of them may be implemented in one crane, in which case the feature may be selected by the operator, and the controlling module is responsive to the selection and operates correspondingly.

Although, in the above, it is assumed that the rope angle should be the same as the target angle, it should be appreciated that some kind of tolerances may be used. In other words, if the tolerance is ±0.5° and the target angle is 3°, a rope angle 3.5° is interpreted to be the same as the target angle.

As is evident from the above, each different example provides cost-efficient and simple, solid technique requiring very little maintenance and none or very little structural modifications for current trolleys, thereby facilitating, for example, upgrading of a crane to contain a corresponding functionality and to provide corresponding advantages. The upgrading may be performed by installing a corresponding kit on the crane during maintenance or rebuild, as described above.

It should be appreciated that FIGS. 2A to 2E are only examples of arrangement usable with the functionalities disclosed above. One or more module may be chosen from one of the FIGS. 2A to 2E and added to an arrangement of another Figure, either as an additional module or replacing one or more modules in order to implement some functionality, depending on, for example, the crane hardware components, control system arrangements and architecture. In the selection of modules for a particular crane, one has to consider at least the following points:

1) Which measurement method is the best for compensation of trolley and/or bridge speed change effects to obtain corrected angle information $\theta_{cor}$.

2) Which variable, $\theta_{cor}$ or $\theta_{est}$, needs to be used as angle information i.e. is an observer needed or not.

3) Which control method is used, i.e. is it possible to use $v_{ref}$ (a P-controller) directly via analog or fieldbus interface of a drive or is it useful to implement the control via the digital interface of the drive (modified control commands).

4) Which functionalities need to be supported. For example, is it necessary to have anti-sway only or should the controlling module also implement a collision and load entanglement detector functionality.

Based on these selections, the actual realization is derived, based on the numerous examples described above.

It will be obvious to a person skilled in the art that, as technology advances, the inventive concept can be implemented in various ways. The invention and its embodiments are not limited to the examples described above but may vary within the scope of the claims.

The invention claimed is:

1. A method for a crane, the method comprising:
receiving angle feedback information on a hoisting rope angle of a crane, the angle feedback information being measured from the hoisting rope by means of a sensor at or adjacent to a trolley of the crane;
correcting the received angle feedback information by compensating, using results obtained via a feedback loop comprising at least preceding angle feedback information measured by the sensor from the hoisting rope, an error caused by a speed change, and
processing the corrected angle feedback information to provide movement instructions or other control information relating to the crane.

2. A method as claimed in claim 1, further comprising:
performing the compensating by low-pass filtering the angle feedback information and subtracting from the filtered angle feedback information an acceleration value or an output of a compensation gain that receives as input an acceleration value reflecting the speed change.

3. A method as claimed in claim 2, further comprising:
determining the acceleration value by using preceding control information or speed instructions or received acceleration information or by calculating it from a measured speed or by measuring a distortion angle from the trolley.

4. A method as claimed in claim 1, further comprising:
using the corrected angle feedback information to determine whether or not a load to be lifted is essentially at least below a trolley or to determine whether or not the rope is vertical enough,
moving at least the trolley on the basis of the corrected angle feedback information towards a direction that will place the trolley essentially above the load or towards the direction in which the rope angle approaches a target angle in which the rope is vertical enough.

5. A method as claimed in claim 1, further comprising:
using the corrected angle feedback information to determine whether or not a load to be lifted is essentially at least below a bridge or to determine whether or not the rope is vertical enough,
moving at least the bridge on the basis of the corrected angle feedback information towards a direction that will place the bridge essentially above the load or towards the direction in which the rope angle approaches a target angle in which the rope is vertical enough.

6. A method as claimed in claim 1, further comprising:
comparing the corrected angle feedback information with a predetermined limit value for generating an alert;
if the value is exceeded, generating an alert to an operator of the crane.

7. A method as claimed in claim 6, further comprising sending to a user apparatus controlling information according to the comparison results, the controlling information including at least one of sound playing instructions, vibration instructions and illuminating instructions for control lights in the user apparatus.

8. A method as claimed in claim 1, further comprising:
comparing the corrected angle feedback information with a predetermined limit value; and
if the limit value is exceeded, preventing at least one of lifting and movement in one or more directions that increase the absolute value of the rope angle.

9. A method as claimed in claim 1, further comprising:
using the corrected angle feedback information to calculate an absolute value of an estimated sway angular speed while the crane is moving; and
if the absolute value of the estimated sway angular speed is greater than a limit, detecting a collision or a load entanglement.

10. A method as claimed in claim 9, further comprising:
monitoring, whether or not the absolute value of the estimated sway angular speed remains greater than the limit for a predetermined time period; and
detecting a collision or a load entanglement in response to the absolute value of the estimated sway angular speed remaining greater than the limit for the predetermined time period.

11. A method as claimed in claim 1, further comprising:
comparing the absolute value of the corrected angle feedback information with a threshold; and
if the threshold is exceeded, detecting a collision or a load entanglement.

12. A method as claimed in claim 1, further comprising:
using the corrected angle feedback information to calculate an absolute value of estimated angular acceleration while the crane is moving; and if the absolute value of the estimated angular acceleration fulfils a predetermined rule, detecting a collision or a load entanglement.

13. A method as claimed in claim 1, further comprising:
obtaining information on the area where the crane is moving and an estimate of the rope length;
using the obtained rope length and the angle feedback information to determine an estimated three-dimensional location of the load or a hook;
comparing the location with the information on the area; and
in response to detecting that the location is in or near a protected area, stopping the crane.

14. A method as claimed in claim 1, further comprising:
using the corrected angle feedback information to dampen a sway.

15. A method as claimed in claim 1, wherein the angle feedback information is measured by means of only one sensor.

16. A method as claimed in claim 1, wherein the sensor measuring angle feedback information is mounted directly to the rope, in the rope's end anchored to the trolley, near to the anchorage, to a fastening means of the rope, to a support of a rope drum, or near the end of the rope to a point which is not rolled up to a drum, or to a sleeve-like structure surrounding the rope.

17. A non-transitory computer readable recording medium having recorded thereon a program for executing a method, the method comprising:
receiving angle feedback information on a hoisting rope angle of a crane, the angle feedback information being measured from the hoisting rope by means of a sensor at or adjacent to a trolley of the crane;
correcting the received angle feedback information by compensating, using results obtained via a feedback loop comprising at least preceding angle feed-back information measured by the sensor from the hoisting rope, an error caused by a speed change, and
processing the corrected angle feedback information to provide movement instructions or other control information relating to the crane.

18. A kit for a crane comprising:
an angle sensor to be mounted at or adjacent to a trolley of the crane for measuring angle feedback information from a hoisting rope of the crane; and
a controlling module comprising an interface for receiving angle feedback information from the angle sensor and being configured to correct received angle feedback information by compensating, using results obtained via a feedback loop comprising at least preceding angle feed-back information received from the angle sensor, an error caused by a speed change, and to process the corrected angle feedback information to provide movement instructions or other control information relating to the crane, the controlling module comprising an interface for providing the movement instructions or the other control information to a crane mechanism or to a user interface.

19. A kit as claimed in claim 18, wherein the angle sensor comprises at least one of the following: an inclinometer, an accelerometer, a gyroscope, and a hinge or knuckle jointed bar.

20. A kit as claimed in claim 18, the kit further comprising an angle distortion sensor to measure the effect of speed change of the trolley and/or the bridge, and the controlling module further comprising an interface for receiving angle distortion information.

21. A kit as claimed in claim 18, wherein the kit is further configured to measure the rope length.

22. A kit as claimed in claim 18, wherein the kit further comprises:
a measuring member to be mounted on a trolley;
a wire connected to the measuring member, and to be connected to a guiding member guiding the rope when it is rolled, wherein the wire is arranged to reel in to and out from the measuring member according to movements of the guiding member to which it is connected;
wherein the measuring member is configured to determine the distance of the hook from the drum of the crane by means of the wire.

23. A kit as claimed in claim 18, the kit being further configured to detect tightness of the rope.

24. A kit as claimed in claim 23, wherein the kit comprises one or more force sensors, or load cells, or strain gauges to detect the tightness of the rope, or an interface for receiving load weight measurement information to detect the tightness of the rope, or is configured to detect the tightness from hoisting motor current measurement.

25. A kit as claimed in claim 18, wherein the controlling module comprises at least:
a low-pass filter connected to the interface for receiving angle feedback information to receive the angle feedback information as an input;
a gain using a reference speed information or a speed of the crane or an acceleration value of the crane as input,
a subtractor connected to the low-pass filter and the gain to receive inputs and being arranged to subtract the input received from the gain from the input received from the low-pass filter and to output the corrected angle feedback information.

26. A kit as claimed in claim 25, wherein the controlling module further comprises:
a dead zone unit connected to the subtractor to receive input therefrom;
a gain connected to the dead zone unit to receive input therefrom and to provide a first reference speed;
a switch for selecting between the first reference speed and a second reference speed, the second reference speed being a speed given by an operator;
a rate limiter connected to the switch to obtain an input; and
a controller connected to the rate limiter for obtaining input and connected to the interface for providing corresponding control information to the crane or to a user interface.

27. A kit as claimed in claim 25, wherein the controlling module further comprises:
an observer connected to the subtractor to receive an input therefrom and configured to obtain the acceleration value as a second input;
a second gain connected to the observer to obtain an input;
a first rate limiter connected to the second gain for limiting the output of the second gain;
a second rate limiter for limiting the speed given by the operator;
a second subtractor connected to the first and the second rate limiter for subtracting the output of the first rate limiter from the output of the second rate limiter; and
a controller connected to the second subtractor to receive a first input, and connected to the interface for providing corresponding control information to the crane or to a user interface.

28. A kit as claimed in claim 25, wherein the controlling module further comprises:
- an observer connected to the subtractor to receive an input therefrom and configured to obtain the acceleration value as a second input;
- a command processing unit connected to the observer to receive as a first input an estimated sway angle from the observer, and to the subtractor to receive as a second input a corrected angle value from and the subtractor, and to an interface to receive via the interface a reference speed formed from a command given by an operator as a third input, the command processing unit being further connected to a speed control unit for providing control information to the speed control unit in the form of modified control commands.

29. A kit as claimed in claim 25, wherein the controlling module further comprises a differentiator to provide the acceleration value.

30. A kit as claimed in claim 18, wherein the controlling module further comprises:
- a low-pass filter connected to the interface for receiving angle feedback information to receive as an input the angle feedback information;
- a subtractor connected to the low-pass filter to receive input and being arranged to subtract the input received from the angle distortion sensor from the input received from the low-pass filter and to output the corrected angle feedback information;
- a gain connected to the interface for receiving as input the angle distortion information,
- an observer connected to the subtractor to receive an input therefrom and to the gain to receive an acceleration value as a second input,
- a command processing unit connected to the observer to receive as a first input an estimated sway angle from the observer, and to the subtractor to receive as a second input a corrected angle value from and the subtractor, and to an interface to receive via the interface a reference speed formed from a command given by an operator as a third input, the command processing unit being further connected to a speed control unit for providing control information to the speed control unit in the form of modified control commands.

31. A kit as claimed in claim 18, wherein the controlling module comprises a computing unit or a computing unit and a frequency converter as a controller.

32. A kit as claimed in claim 18, wherein the kit is a repair kit or equipment mounted on a crane during the manufacture of the crane.

33. A crane comprising:
- crane mechanism;,
- a hoisting rope; and
- a kit comprising:
- an angle sensor to be mounted at or adjacent to a trolley of the crane for measuring angle feedback information from the hoisting rope; and
- a controlling module comprising an interface for receiving angle feedback information from the angle sensor and being configured to correct received angle feedback information by compensating, using results obtained via a feedback loop comprising at least preceding angle feed-back information received from the angle sensor, an error caused by a speed change, and to process the corrected angle feedback information to provide movement instructions or other control information relating to the crane, the controlling module comprising an interface for providing the movement instructions or the other control information to the crane mechanism or to a user interface.

34. A crane as claimed in claim 33, further comprising:
- a control pole over which the rope rolls;
- a guiding member guiding the rope over the control pole;
- a measuring member mounted on the trolley;
- a wire connected to the guiding member and the measuring member and arranged to reel in to and out from the measuring member;
- wherein the measuring member is configured to determine the distance of the hook from the drum of the crane.

35. A method comprising upgrading a crane by installing in the crane a kit comprising:
- an angle sensor to be mounted at or adjacent to a trolley of the crane for measuring angle feedback information from the hoisting rope; and
- a controlling module comprising an interface for receiving angle feedback information from the angle sensor and being configured to correct received angle feedback information by compensating, using results obtained via a feedback loop comprising at least preceding angle feed-back information received from the angle sensor, an error caused by a speed change, and to process the corrected angle feedback information to provide movement instructions or other control information relating to the crane, the controlling module comprising an interface for providing the movement instructions or the other control information to the crane mechanism or to a user interface.

* * * * *